United States Patent
Nagata et al.

(10) Patent No.: US 12,084,090 B2
(45) Date of Patent: Sep. 10, 2024

(54) DRIVING CONTROL DEVICE AND VEHICLE BEHAVIOR SUGGESTION DEVICE

(71) Applicant: DENSO CORPORATION, Kariya (JP)

(72) Inventors: Asako Nagata, Kariya (JP); Yuji Ota, Kariya (JP); Takeshi Yamamoto, Kariya (JP); Shizuka Yokoyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 285 days.

(21) Appl. No.: 17/671,149

(22) Filed: Feb. 14, 2022

(65) Prior Publication Data

US 2022/0194433 A1    Jun. 23, 2022

Related U.S. Application Data

(63) Continuation of application No. PCT/JP2020/027589, filed on Jul. 16, 2020.

(30) Foreign Application Priority Data

Aug. 19, 2019  (JP) ................. 2019-150017

(51) Int. Cl.
*B60W 60/00* (2020.01)
*B60W 30/14* (2006.01)
(Continued)

(52) U.S. Cl.
CPC ...... *B60W 60/0057* (2020.02); *B60W 30/143* (2013.01); *B60W 30/182* (2013.01);
(Continued)

(58) Field of Classification Search
CPC ......... B60W 60/0057; B60W 60/0013; B60W 60/0053; B60W 30/143; B60W 30/182;
(Continued)

(56) References Cited

U.S. PATENT DOCUMENTS

| | | | | |
|---|---|---|---|---|
| 5,839,015 A | * | 11/1998 | Faguy | B65H 1/18 399/23 |
| 2013/0335418 A1 | * | 12/2013 | Kim | G16H 20/60 345/424 |

(Continued)

FOREIGN PATENT DOCUMENTS

| | | |
|---|---|---|
| JP | 2017198505 A | 11/2017 |
| JP | 2018180689 A | 11/2018 |
| WO | WO-2019026469 A1 | 2/2019 |

*Primary Examiner* — Anshul Sood
*Assistant Examiner* — Oliver Tan
(74) *Attorney, Agent, or Firm* — Harness, Dickey & Pierce, P.L.C.

(57) ABSTRACT

A vehicle switches between an autonomous driving state, in which the vehicle is responsible for implementing driving tasks including vehicle steering, vehicle driving, vehicle braking, and periphery monitoring, and a manual driving state or a driving assistance state, in which a driver of the vehicle is responsible for implementing at least one of the driving tasks. A processor implements the driving tasks based on a vehicle behavior plan, which indicates a vehicle behavior scheduled in the autonomous driving state, and generates a second task priority plan, which is the vehicle behavior plan until the driving mode is switched from the autonomous driving state to the manual driving state, such that a convenient finish time, at which a second task implemented by the driver in the autonomous driving state is conveniently finished, comes before the driving mode switching.

11 Claims, 9 Drawing Sheets

(51) Int. Cl.
*B60W 30/182* (2020.01)
*B60W 40/02* (2006.01)
*B60W 40/08* (2012.01)
*B60W 50/14* (2020.01)
*G06V 20/59* (2022.01)

(52) U.S. Cl.
CPC ............ *B60W 40/02* (2013.01); *B60W 40/08* (2013.01); *B60W 50/14* (2013.01); *B60W 60/0013* (2020.02); *B60W 60/0053* (2020.02); *G06V 20/597* (2022.01); *B60W 2040/0818* (2013.01); *B60W 2050/143* (2013.01); *B60W 2050/146* (2013.01); *B60W 2540/215* (2020.02); *B60W 2540/229* (2020.02)

(58) Field of Classification Search
CPC ...... B60W 40/02; B60W 40/08; B60W 50/14; B60W 2540/215; B60W 2540/229; B60W 2040/0818; B60W 2050/143; B60W 2050/146; G06V 20/597
See application file for complete search history.

(56) References Cited

U.S. PATENT DOCUMENTS

| | | | |
|---|---|---|---|
| 2017/0308094 A1 | 10/2017 | Abe et al. | |
| 2019/0025825 A1* | 1/2019 | Takahama | ........... B60W 50/082 |
| 2020/0019163 A1 | 1/2020 | Horii et al. | |

\* cited by examiner

DRIVING CONTROL DEVICE AND VEHICLE BEHAVIOR SUGGESTION DEVICE

CROSS REFERENCE TO RELATED APPLICATION

The present application is a continuation application of International Patent Application No. PCT/JP2020/027589 filed on Jul. 16, 2020, which designated the U.S. and claims the benefit of priority from Japanese Patent Application No. 2019-150017 filed on Aug. 19, 2019. The entire disclosures of all of the above applications are incorporated herein by reference.

TECHNICAL FIELD

The disclosure in this description relates to a driving control device and a vehicle behavior suggestion device.

BACKGROUND

In recent years, vehicles involving driving mode switching between an autonomous driving state and a manual driving state or a driving assistance state have been rapidly spreading. A known driving control device controls driving in such a vehicle.

SUMMARY

According to an aspect of the present disclosure, a vehicle involves driving mode switching between an autonomous driving state, in which the vehicle is responsible for implementing driving tasks including vehicle steering, vehicle driving, vehicle braking, and periphery monitoring, and a manual driving state or a driving assistance state, in which a driver of the vehicle is responsible for implementing at least one of the driving tasks. A driving control device is configured to control driving of the vehicle and includes: a driving task implementation unit configured to implement any of the driving tasks based on a vehicle behavior plan, which indicates a vehicle behavior scheduled in the autonomous driving state; and a vehicle behavior plan generation unit configured to generate a second task priority plan, which is the vehicle behavior plan until the driving mode is switched from the autonomous driving state to the manual driving state.

According to an aspect of the present disclosure, a vehicle behavior suggestion device is configured to suggest a vehicle behavior plan in the autonomous driving state of the vehicle. The vehicle behavior suggestion device includes: a second task information grasp unit configured to grasp information related to a second task of the driver in the autonomous driving state; and a vehicle behavior plan suggestion unit configured to generate, by using the information, a second task priority plan, which is the vehicle behavior plan until the driving mode is switched from the autonomous driving state to the manual driving state, and suggest the second task priority plan to the driver.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
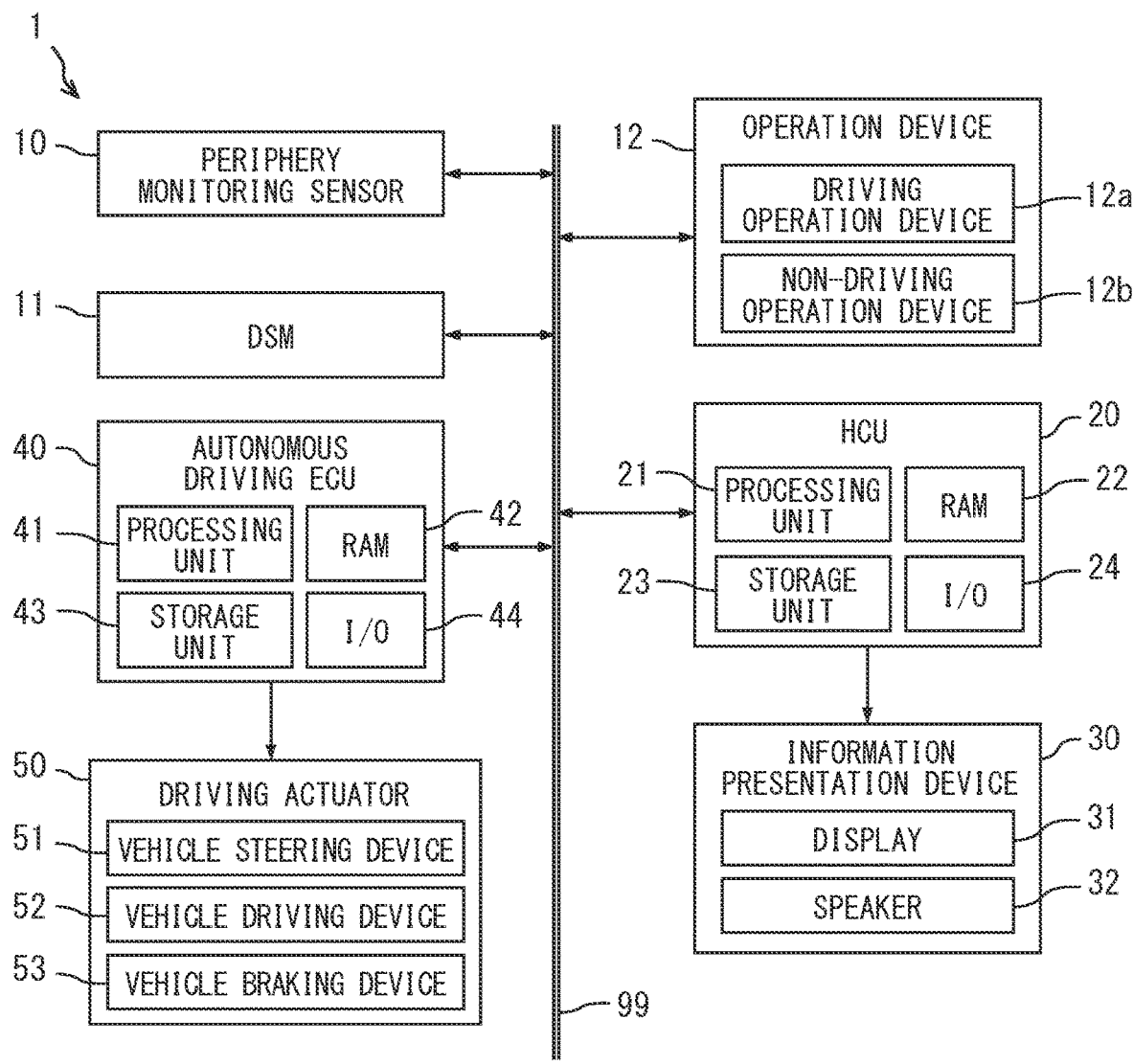
FIG. 1 is a diagram illustrating an overall picture of an in-vehicle network including an autonomous driving ECU in a first embodiment.

As follows, examples of the present disclosure will be described.

According to an example of the present disclosure, a vehicle involves driving mode switching between an autonomous driving state, in which the vehicle is responsible for implementing driving tasks including vehicle steering, vehicle driving, vehicle braking, and periphery monitoring, and a manual driving state or a driving assistance state, in which the driver is responsible for at least any one of the driving tasks. In such a vehicle, a driver may be allowed to implement a second task, when the vehicle is in the autonomous driving state.

However, at the time of driving mode switching from the autonomous driving state to the manual driving state or the driving assistance state, the driver is required to direct his or her attention from the second task to driving. As a result, it is concerned that, when the second task is in an inconveniently finished state at the time of driving mode switching, the driver may feel uncomfortable.

According to an example of the present disclosure, a driving control device controls driving of a vehicle involving driving mode switching between an autonomous driving state, in which the vehicle is responsible for implementing driving tasks including vehicle steering, vehicle driving, vehicle braking, and periphery monitoring, and a manual driving state or a driving assistance state, in which a driver of the vehicle is responsible for implementing at least one of the driving tasks. The driving control device includes: a driving task implementation unit configured to implement any of the driving tasks based on a vehicle behavior plan, which indicates a vehicle behavior scheduled in the autonomous driving state; and a vehicle behavior plan generation unit configured to generate a second task priority plan, which is the vehicle behavior plan until the driving mode is switched from the autonomous driving state to the manual driving state, such that a convenient finish time, at which a second task being implemented by the driver in the autonomous driving state is conveniently finished, comes before the driving mode switching.

According to such an aspect, the second task priority plan is a plan in which the convenient finish time, at which the second task being implemented by the driver in the autonomous driving state is conveniently finished, comes before the driving mode switching. When each of the driving tasks in the autonomous driving state is implemented by the driving task implementation unit based on such a plan, at the time of driving mode switching at which a driving mode is switched from the autonomous driving state to the manual driving state or to the driving assistance state, the second task has already been conveniently finished. Accordingly, the driver is enabled to smoothly direct attention from the second task to driving. This enables to inhibit the driver from feeling a sense of discomfort and thereby allow the driver to accept comfortable driving mode switching.

According to an example of the present disclosure, a vehicle involves driving mode switching between an autonomous driving state, in which the vehicle is responsible for implementing driving tasks including vehicle steering, vehicle driving, vehicle braking, and periphery monitoring, and a manual driving state or a driving assistance state, in which a driver of the vehicle is responsible for implementing at least one of the driving tasks. A vehicle behavior suggestion device is configured to suggest a vehicle behavior plan in the autonomous driving state of the vehicle. The vehicle behavior suggestion device includes: a second task information grasp unit configured to grasp information related to a second task of the driver in the autonomous driving state; and a vehicle behavior plan suggestion unit configured to generate, by using the information, a second task priority plan, which is the vehicle behavior plan until the driving mode is switched from the autonomous driving state to the manual driving state, such that a convenient finish time, at which the second task being implemented in the autonomous driving state is conveniently finished, comes before the driving mode switching, and suggest the second task priority plan to the driver.

According to such an aspect, the second task priority plan is a plan in which the convenient finish time, at which the second task being implemented by the driver in the autonomous driving state is conveniently finished, comes before the driving mode switching. Such a plan is generated using the information related to the second task of the driver and suggested to the driver. This allows the driver to choose the second task priority plan depending on whether the driver intends to prioritize the second task or the driving task and thereby selectively implement the second task until the second task is conveniently finished. By allowing the driver to spontaneously select what to do, it is possible to inhibit the driver from feeling a sense of discomfort at the time of driving mode switching and allow the driver to accept comfortable driving mode switching.

Referring to the drawings, a plurality of embodiments will be described. Note that, by giving the same reference numerals to the components corresponding to each other in the individual embodiments, a repeated description thereof may be omitted. When only a part of a configuration is described in each of the embodiments, to the other part of the configuration, the configuration in the other embodiment that has been described previously is applicable. Not only the configurations clearly shown in the description of the embodiments can be combined, but also the configurations in the plurality of embodiments, which are not clearly shown, can partially be combined unless the resulting combination presents a particular problem.

First Embodiment

Figure 2:
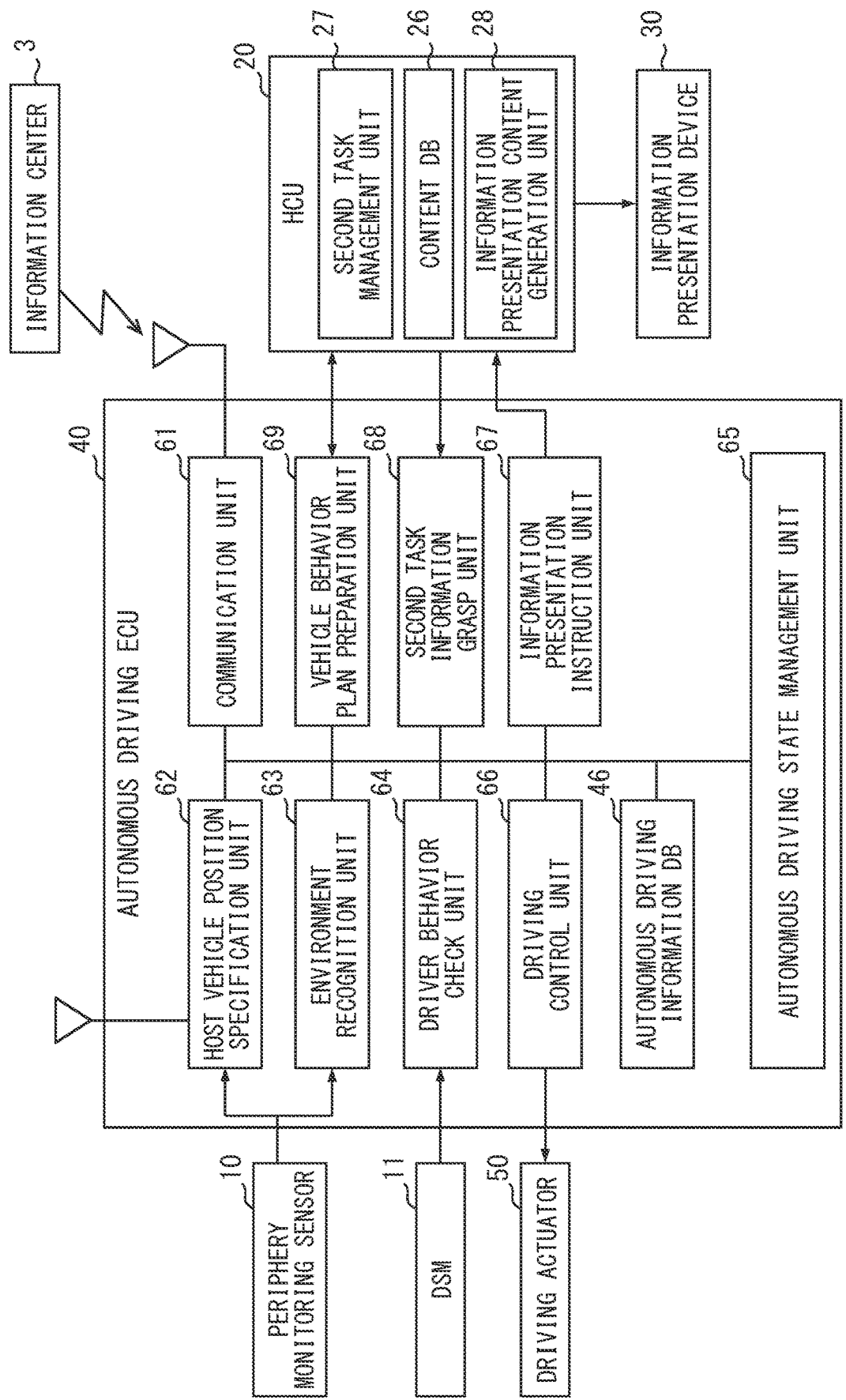
FIG. 2 is a diagram illustrating a schematic configuration of the autonomous driving ECU in the first embodiment.

As illustrated in FIGS. 1 and 2, an autonomous driving ECU (Autonomous Driving Electric Control Unit) 40 according to the first embodiment in the present disclosure is used in a vehicle 1 and, e.g., mounted in the vehicle 1. As a result of the mounting of the autonomous driving ECU 40 therein, the vehicle 1 involves driving mode switching between an autonomous driving state and a manual driving state or a driving assistance state. The autonomous driving state in the present embodiment means a state in which the vehicle 1 is responsible for implementing driving tasks including a driving operation and periphery monitoring. The manual driving state or the driving assistance state in the present embodiment means a state where a driver of the vehicle 1 is responsible for implementing at least either of the driving operation and the periphery monitoring. The driving operation includes vehicle steering, vehicle driving, and vehicle braking. Thus, the vehicle 1 in the present embodiment is capable of performing autonomous driving of level 3 among autonomous driving levels defined by U.S. Society of Automotive Engineers.

The autonomous driving ECU 40 is an electronic control device that integrally and compositely implements an autonomous driving function, an advanced drive assistance function, and the like. The autonomous driving ECU 40 is configured to be able to control a driving actuator 50.

The driving actuator 50 is configured to include a vehicle steering device 51, a vehicle driving device 52, and a vehicle braking device 53 each for implementing the driving tasks. The vehicle steering device 51 is a device that controls a steering angle given to, e.g., front wheels of the vehicle 1. The vehicle driving device 52 is a device that uses power provided by a power source of the vehicle 1 to drive, e.g., the front wheels of the vehicle 1. The vehicle braking device 53 is a device that brakes, e.g., the front wheels of the vehicle 1 by a braking method such as frictional braking or regenerating braking.

As illustrated in FIG. 1, the autonomous driving ECU 40 is communicatively connected to a communication bus 99 of an in-vehicle network mounted in the vehicle 1. The autonomous driving ECU 40 is one of a plurality of nodes provided on the in-vehicle network. To the communication bus 99 of the in-vehicle network, a periphery monitoring sensor 10, a driver status monitor (DSM) 11, an operation device 12, a HCU 20, and the like are connected as the individual nodes. These nodes connected to the communication bus 99 are communicative with each other.

The periphery monitoring sensor 10 is an autonomous sensor that monitors a peripheral environment included in an external environment of the vehicle 1. The periphery monitoring sensor 10 can detect, from a detection range around the vehicle, moving objects such as a pedestrian, a cyclist, an animal other than a human, and another vehicle and motionless objects such as a fallen object on a road, a guard rail, a curbstone, a road sign, a road mark such as a lane line, and a roadside structure. The periphery monitoring sensor 10 provides detection information obtained by detecting objects around the vehicle 1 to the autonomous driving ECU 40 or the like through the communication bus 99.

The periphery monitoring sensor 10 has, as a detection configuration for object detection, a front camera and millimeter wave radars. The front camera outputs, as the detection information, at least one of imaging data obtained by photographing a range in front of the vehicle 1 and a result of analyzing the imaging data. The plurality of millimeter wave radars are disposed in, e.g., each of front and rear bumpers of the vehicle 1 to be spaced apart from each other. Each of the millimeter radars emits a millimeter wave or a quasi-millimeter wave to a front range, a lateral front range, a rear range, a lateral rear range, or the like of the vehicle 1. The millimeter wave radars generate the detection information by processing of receiving reflected waves resulting from reflection of the millimeter waves or the quasi-millimeter waves by the moving objects and the motionless objects. Note that a detection configuration such as a LiDAR or a sonar may also be included in the periphery monitoring sensor 10.

The DSM 11 is a configuration including a near-infrared light source, a near-infrared camera, and a control unit that controls the near-infrared light source and the near-infrared camera. The DSM 11 is disposed on, e.g., an upper surface of a steering column portion, an upper surface of an instrument panel, or the like, while being in a posture in which the near-infrared camera faces a photographing range including a head rest portion of a driver seat. The DSM 11 functions as a driver photographing unit that photographs, using the near-infrared camera, a head region of the driver illuminated with the near-infrared light from the near-infrared light source or the like. The control unit extracts, from a photographed image, information including information on a line of sight in the head region of the driver and provides the extracted information to the autonomous driving ECU 40 or the like.

The operation device 12 is an intention input unit that receives a user operation by the driver or the like. The operation device 12 includes a driving operation device 12a for the driver to perform the driving operation included in the driving tasks in a state where the autonomous driving function is halted, such as a steering wheel, an acceleration pedal, or a brake pedal. When the user operation is performed on the driving operation device 12a, information on the user operation is provided to the autonomous driving ECU 40 or the like.

The operation device 12 also includes a non-driving operation device 12b to which a user operation for switching between start and stop and changing setting for an autonomous driving function, an air conditioning function, a content reproduction function, or the like is input. Examples of the non-driving operation device 12b for performing these user operations include a steer switch provided in a spoke portion of a steering wheel, an operation lever provided in the steering column portion, a touch panel provided on a display 31, and a gesture operation device that detects a gesture as the user operation. When the user operation is performed on the non-driving operation device 12b, information on the user operation is provided to the autonomous driving ECU 40, the HCU 20, and the like.

The HCU 20 is an electronic control device that comprehensively controls presentation of information by information presentation device 30 such as the display or a speaker 32. The display 31 is a display device that displays information by using an image to an occupant such as the driver. The display 31 includes a meter display provided opposite to the driver seat with the steering column portion being interposed therebetween, a head-up display that displays a virtual image overlapping a peripheral environment in air opposite to the driver seat with a windshield being interposed therebetween, a center display provided at a center portion of the instrument panel, and the like.

The speaker 32 is disposed in, e.g., the vicinity of a screen of the display 31 in the instrument panel, a door panel of the vehicle 1, a rear quarter panel thereof, or the like. For example, the speaker 32 converts an electric signal input thereto to a physical signal by using a voice coil and a diaphragm to be able to make a sound.

The HCU 20 is configured to include, as a main component, a computer including a processing unit 21, a RAM (Random Access Memory) 22, a storage unit 23, an input/output interface 24, a bus connecting these units and interface, and the like. The processing unit 21 is hardware connected to the RAM 22 to perform arithmetic processing. The processing unit 21 is configured to include at least one arithmetic core such as a CPU (Central Processing Unit) or a GPU (Graphic Processing Unit). The processing unit 21 may also be configured to include a FPGA (Field-Programmable Gate Array), another IP core having a dedicated function, and the like. The RAM 22 may be configured to include a video RAM for video generation. The processing unit 21 accesses the RAM 22 to perform various processing for implementing respective functions of individual functional units described later. The storage unit 23 is configured to include a nonvolatile storage medium. In the storage unit 23, various programs (e.g., an information presentation control program) to be implemented by the processing unit 21 are stored.

As illustrated in FIG. 2, the storage unit 23 has built, as a database, a content database 26 in which one or both of reproduction target data of reproduction contents configured to be reproducible by the information presentation device 30 and a list of the contents. The list of the reproduction contents has either one or both of the contents stored in the storage unit 23 and contents downloadable from an external server such as an information center by, e.g., streaming, progressive download, batch download, or the like. Examples of the reproduction contents include multimedia contents such as a movie, a TV show, an Internet-delivered video, and an audio book.

The HCU 20 has the plurality of functional units for executing the programs stored in the storage unit 23 by using the processing unit 21 and thereby presenting information to the driver. Specifically, the HCU 20 includes a second task management unit 27 and an information presentation content generation unit 28.

The second task management unit 27 manages second tasks to be implemented by the driver in the autonomous driving state. The second tasks mentioned herein are secondary tasks indicating tasks other than driving when the driving task is assumed to be a primary task, and are referred to also as the secondary tasks or secondary activities. The second tasks are a concept including various types of tasks such as viewing of the reproduction contents mentioned above, a computer game, operations of checking and transmitting electronic mails, viewing of a website, and operations on a mobile telephone or a smartphone, a meal, makeup (maquillage), and book reading.

The second task management unit 27 specifies a type of the second task currently being implemented by the driver in the autonomous driving state. This specification is processed based on information on the content reproduction function set by the user operation, extraction information from the DSM 11, information on a driver state analyzed by the autonomous driving ECU 40 described later, and the like. The second task management unit 27 manages, when the specified type of the second task includes the reproduction content, a state of reproduction of the reproduction target data of the reproduction content selected based on the user operation in the information presentation device 30.

The second task management unit 27 also recognizes a convenient finish time at which the second task currently being performed is conveniently finished. The convenient finish time is a concept including a completion time at which the currently performed second task is completed and an appropriate interruption time appropriate to interrupt the currently performed second task.

For example, when the type of the second task currently being performed is viewing of the reproduction content, the second task management unit 27 can calculate the convenient finish time based on the remaining reproduction time period until the reproduction of the reproduction content is completed.

Alternatively, when the type of the second task currently being implemented is a task of a type which is not restricted by an electromagnetic method such as a meal, makeup, or book reading, the second task management unit 27 predicts the convenient finish time based on the extraction information acquired from the DSM 11, driver behavior information acquired from the autonomous driving ECU 40, and the like. Specifically, when the second task is a meal, the second task management unit 27 can predict a completion time based on the progress of the meal (a speed at which the meal proceeds and a remaining amount of the meal) being taken by the driver. Alternatively, when the second task is the makeup, the second task management unit 27 can predict a completion time based on the progress of the makeup (an area where the makeup is done and a degree of doneness) performed by the driver. When the second task is book reading, the second task management unit 27 can predict the convenient finish time based on a title of a book extracted from the imaging data in the DSM 11, a thickness of the book before and after an open page, and the like.

For example, when the second task currently being performed has a property such that the convenient finish time is hard to predict or unpredictable, such as viewing of a website (net surfing), the second mask management unit 27 does not set the convenient finish time. When a request to acquire the convenient finish time is issued, the second task management unit 27 provides information indicating that the convenient finish time is unpredictable to a requester, instead of returning a value of the convenient finish time.

The information presentation content generation unit 28 generates an information presentation content based on an information presentation instruction input thereto from the autonomous driving ECU 40, reproduction state management information about reproduction of the reproduction content managed by the second task management unit 27, and the like and controls the information presentation device 30 based on the information presentation content. The information presentation content mentioned herein includes video data to be sequentially displayed on the display 31 and sound data for causing the speaker 32 to make a sound. The information presentation content generation unit 28 draws an image in each of frame images included in the video data and also generates sound data associated with the video data.

The information presentation content generation unit 28 assigns a display content to be displayed on the display 31 to the meter display, the head-up display, and the center display. The information presentation content generation unit 28 assigns a vehicle speed content which displays a state (e.g., vehicle speed) of the vehicle 1 included in the information presentation instruction to the meter display. When the information presentation instruction includes a driving mode switching content which recommends, suggests, or cautions about driving mode switching, the information presentation content generation unit 28 assigns the driving mode switching content to an appropriate display depending on the situation. The information presentation content generation unit 28 assigns, based on the reproduction state management information about the reproduction content, display of the video data read from the reproduction target data to the center display.

The information presentation device 30 performs, based on the video data and the sound data generated by the information presentation content generation unit 28, information presentation using an image and a sound.

As illustrated in FIG. 1, the autonomous driving ECU 40 is configured to include, as a main component, a computer including a processing unit 41, a RAM (Random Access Memory) 42, a storage unit 43, an input/output interface 44, a bus connecting these units and interface, and the like. The processing unit 41 is hardware connected to the RAM 42 to perform arithmetic processing. The processing unit 41 is configured to include at least one arithmetic core such as a CPU (Central Processing Unit) or a GPU (Graphic Processing Unit). The processing unit 41 may also be configured to include a FPGA (Field-Programmable Gate Array), another IP core having a dedicated function, and the like. The RAM 42 may be configured to include a video RAM for video generation. The processing unit 41 accesses the RAM 42 to perform various processing for implementing the respective functions of the individual functional units described later. The storage unit 43 is configured to include a nonvolatile storage medium. In the storage unit 43, various programs to be executed by the processing unit 41 are stored.

As illustrated in FIG. 2, the autonomous driving ECU 40 has the plurality of functional units which execute the programs stored in the storage unit 43 by using the processing unit 41 so as to implement an autonomous driving function and an advanced drive assistance function. Specifically, the autonomous driving ECU 40 includes a communication unit 61, a host vehicle position specification unit 62, an environment recognition unit 63, a driver behavior check unit 64, an autonomous driving state management unit 65, a driving control unit 66, an information presentation instruction unit 67, a second task information grasp unit 68, and a vehicle behavior plan preparation unit 69.

The autonomous driving ECU 40 has also built, as a database stored in the storage unit 43, an autonomous driving information database (hereinafter referred to as the autonomous driving information DB) 46. The autonomous driving information DB 46 is configured to include, as a main component, a nonvolatile memory serving as a storage medium, and stores data for autonomous driving. The data for autonomous driving includes highly accurate map data (hereinafter referred to as the high-accuracy map data) prepared for autonomous driving. The high-accuracy map data includes three-dimensional shape information on roads including points of intersection, lane number information, information indicating a direction of travel allowed for each of lanes, information on laying of crosswalks and bicycle lanes, speed limit information, information indicating zones in which level-3 autonomous driving is possible, and the like.

The information indicating the zones in which the level-3 autonomous driving is possible may be information directly indicating the zones in which the level-3 autonomous driving is possible or indirect information for determination of whether the level-3 autonomous driving is possible or to be restricted. The indirect information may be information indicating a road infrastructure development condition for the autonomous driving or information on regulations indicating requirements for specifying zones in which autonomous driving is restricted.

The communication unit 61 uses a wireless communication device capable of wireless communication or the like to communicate with an information center 3 provided outside the vehicle 1. As the wireless communication, telecommunication using, e.g., a mobile-phone line may be used, but it may also be possible to use a near field communication using standards of Bluetooth (registered trademark), Wi-Fi (registered trademark), or the like. For example, the information center 3 is a probe server provided on a cloud. The information center 3 is configured to include a storage unit in which not only information for updating the high-accuracy map data stored in the autonomous driving information DB 46, but also traffic information (e.g., information on an amount of traffic, traffic jam information, or traffic accident information) serving as information on the external environment of the vehicle 1, weather information, and the like are stored. The information center 3 may also serve as a source from which the reproduction contents described above are to be downloaded. Note that the wireless communication device may be incorporated in the autonomous driving ECU 40 or may also be a device connected to the communication bus 99 of the in-vehicle network and independently provided outside the autonomous driving ECU 40, such as a DCM (Data Communication Module).

The host vehicle position specification unit 62 specifies a latest position and a latest azimuth for the vehicle 1. The specification is based on information acquired from the periphery monitoring sensor 10 and a GNSS (Global Navigation Satellite System) receiver and the like. The GNSS receiver receives a positioning signal transmitted from a plurality of artificial satellites (positioning satellites) of a satellite positioning system (e.g., GPS). Note that the GNSS receiver may also be incorporated in the automatic driving ECU 40 or may also be a device connected to the communication bus 99 of the in-vehicle network and provided independently outside the autonomous driving ECU 40.

The environment recognition unit 63 recognizes the external environment of the vehicle 1. The recognition is based on information on a position and a direction each specified by the host vehicle position specification unit 62, detection information of a peripheral environment from the periphery monitoring sensor 10, the high-accuracy map data and the traffic information each acquired from the autonomous driving information DB 46, and the like.

The driver behavior check unit 64 recognizes a behavior of the driver. The behavior of the driver can be recognized by acquiring the information from the DSM 11, analyzing the information acquired from the DSM 11, and the user operation input by the driver through the operation device 12. The driver behavior check unit 64 provides the recognized driver behavior information in response to a request from the HCU 20.

The autonomous driving state management unit 65 manages the state of the autonomous driving based on information on the position and azimuth of the vehicle 1 specified by the host vehicle position specification unit 62, the information on the peripheral environment recognized by the environment recognition unit 63, the traffic information and the weather information each acquired by the communication unit 61, information on the setting of the autonomous driving function set by the non-driving operation device 12b, information on the user operation input to the driving operation device 12a, and the like. In particular, in the present embodiment, the autonomous driving state management unit 65 manages the autonomous driving level defined as a vehicle control state and switches the autonomous driving level at an appropriate time. In the present embodiment, the autonomous driving level has a discrete numerical value which is an integer of at least 0 and not more than 3. The autonomous driving level means that, as the numerical value increases, the vehicle-side authority to implement the driving tasks has a wider scope.

For example, when the autonomous driving level is a level 0, the driver is responsible for implementing all the driving tasks. When the autonomous driving level is a level 1, the vehicle 1 is responsible for performing either the vehicle steering or the vehicle driving and vehicle braking, while the driver is responsible for implementing all the other driving tasks. When the autonomous driving level is a level 2, the vehicle 1 is responsible for performing driving operations for the vehicle steering, the vehicle driving, and the vehicle braking, while the driver is responsible for performing the periphery monitoring and also required to monitor the situation in which the driving operation is performed by the vehicle 1 and maintain a state where the driver can immediately operate the driving operation device 12a by the holding of the steering wheel or the like so as to be able to intervene in the driving operation at any time. Accordingly, since it can be said that functioning on the level 1 and the level 2 is a function partially substituting for the driving tasks, functioning on the level 1 and the level 2 can be said to be the advanced drive assistance function. In the present embodiment, as described above, a level 0 state can be categorized as the manual driving state, while level 1-2 states can be categorized as the driving assistance state.

When the autonomous driving level is a level 3, the vehicle 1 is responsible for implementing all the driving tasks of the vehicle steering, the vehicle driving, the vehicle braking, and the periphery monitoring, and the autonomous driving ECU 40 of the vehicle 1 substantially implements these driving tasks. At this time, the driver is enabled to implement the second task without monitoring a situation in which the driving tasks are implemented by the autonomous driving ECU 40. In the present embodiment, as described above, the level 3 state is categorized as the autonomous driving state.

However, driving mode switching such that the autonomous driving level is switched from the level 3 to a level equal to or lower than the level 2, i.e., the authority to implement the driving tasks is transferred from the vehicle 1 to the driver may occur.

When the autonomous driving function has reached a functional limit or when reaching of the functional limit is expected, the autonomous driving state management unit 65 determines to switch the autonomous driving level from the level 3 to a level equal to or lower than the level 2. Examples of the reaching of the functional limit include occurrence of an event unexpected by the autonomous driving ECU 40 in the peripheral environment and difficulty to continue the operation of the autonomous driving function resulting from malfunction of the periphery monitoring sensor 10 due to adverse weather or the like.

The autonomous driving state management unit 65 also determines to switch the autonomous driving level from the level 3 to a level equal to or lower than the level 2 in response to an operation of changing the setting of the autonomous driving function by the driver, which is recognized through the driver behavior check unit 64.

The autonomous driving state management unit 65 also determines to switch the autonomous driving level from the level 3 to a level equal to or lower than the level 2 when entrance of the vehicle 1 from a possible zone in which level 3 autonomous driving is possible into an impossible zone in which the level 3 autonomous driving is impossible is expected. Examples of the entrance into the impossible zone include entrance from a highway as the possible zone into a general road as the impossible zone. In this example, the level 3 autonomous driving is possible up to an interchange exit ("IC Exit" in the drawing) of the highway.

The driving control unit 66 controls the driving actuator 50 based on the autonomous driving level managed by the autonomous driving state management unit 65. When the autonomous driving level is the level 0, the driving control unit 66 acquires information on the user operation input from the driving operation device 12a to the autonomous driving ECU 40 through the driver behavior check unit 64. The driving control unit 66 controls the driving actuator 50 such that the driving actuator 50 operates in an amount of operation faithful to the user operation and with operation timing faithful to the user operation. In other words, the driver who operates the driving operation device 12a is substantially responsible for implementing the driving task.

Meanwhile, when the autonomous driving level is the level 3, the driving control unit 66 implements the driving task based on the vehicle behavior plan prepared by the vehicle behavior plan preparation unit 69. Specifically, the driving control unit 66 calculates an operation of the driving actuator 50 for driving the vehicle 1 based on the vehicle behavior plan and controls the driving actuator 50 so as to implement the calculated operation. In other words, the autonomous driving ECU 40 of the vehicle 1 is substantially responsible for implementing the driving task.

When the autonomous driving level is the level 1 or 2, intermediate control between control on the level 0 described above and the control on the level 3 is performed. By way of example, the control equivalent to that on the level 0 is performed on any of devices of the driving actuator 50, while the control equivalent to that on the level 3 is performed on another of the devices of the driving actuator 50.

The information presentation instruction unit 67 sequentially provides the HCU 20 with information to be presented to the driver, which is either information indicating the operating state of the autonomous driving ECU 40 or information held by the autonomous driving ECU 40, and also outputs, to the HCU 20, an information presentation instruction to present the information.

When the autonomous driving state management unit 65 determines to switch the autonomous driving level from the level 3 to a level equal to or lower than the level 2, the driving control unit 66 continues the control on the level 3, while waiting to receive the user operation by the driver indicating an intention to take over the implementation of the driving task. To present information related to driving mode switching to the driver, the information presentation instruction unit 67 outputs, to the HCU 20, the information presentation instruction for presenting information via a driving mode switching content that recommends, suggests, or cautions about driving mode switching with predetermined timing. As a result, under the control of the HCU 20, the information presentation device 30 presents, to the driver, information for recommending, suggesting, or cautioning about the driving mode switching via the driving mode switching content.

When recognizing the information via the driving mode switching content, the driver performs the user operation indicating the intention to take of the implementation of the driving task. Examples of the user operation indicating the intention to take over the implementation of the driving task include an operation of touching the driving operation device 12a such as the steering wheel or a driving operation. When such a user operation is acquired through the driver behavior check unit 64, the autonomous driving state management unit 65 actually switches the autonomous driving level to a level equal to or lower than the level 2, and the driving control unit 66 also starts to perform control on a level equal to or lower than the level 2. Thus, the driving mode switching is performed.

The second task information grasp unit 68 grasps information related to the second task of the driver in the autonomous driving state. Specifically, the second task information grasp unit 68 acquires, from the HCU 20, information on the type of the second task specified by the second task management unit 27 in the HCU 20 and information on the convenient finish time and can thereby grasps the information related to the second task. Accordingly, the second task information grasp unit 68 functions as a second task information acquisition unit.

The second task information grasp unit 68 can also grasp the information related to the second task from information on the behavior of the driver recognized by the driver behavior check unit 64 simultaneously with or instead of acquiring the information from the HCU 20.

The vehicle behavior plan preparation unit 69 generates and prepares a vehicle behavior plan, which indicates a vehicle behavior scheduled in the level 3 autonomous driving state. The preparation includes sequential correction of the vehicle behavior plan based on a change in a peripheral environment or the like while the autonomous driving function is operating. The vehicle behavior plan preparation unit 69 has a generation function of generating the vehicle behavior plan and a suggesting function of suggesting the generated vehicle behavior plan. The vehicle behavior plan includes at least one of a route to a destination of the vehicle 1, a scheduled driving line of the vehicle 1, and a speed of the vehicle 1.

The route to the destination of the vehicle 1 includes rough specification of a road on which the vehicle 1 is to drive. The route to the destination of the vehicle 1 is generated based on information on the destination set by the user operation, the information acquired by the high-accuracy map DB and the host vehicle position specification unit 62, and the like.

The scheduled driving line of the vehicle 1 specifies a lane among a plurality of lanes in which the vehicle 1 is to be driven on the road on which the vehicle 1 is currently driving among the specified roads, a trajectory of a lane change when the vehicle 1 changes lanes, and the like. The scheduled driving line of the vehicle 1 is generated based on information on the position and azimuth specified by the host vehicle position specification unit 62, the information on the peripheral environment recognized by the environment recognition unit 63, and the like.

The speed of the vehicle 1 includes a rough speed (e.g., an average speed for arriving at, e.g., a destination or a stopping point at a predetermined time) corresponding to the route to the destination of the vehicle 1 and a detailed speed in a plan for acceleration/deceleration accompanying a driving operation when the vehicle 1 drives in the scheduled driving line or the like.

The vehicle behavior plan preparation unit 69 uses user interfaces such as the HCU 20 and the information presentation device 30 to suggest the generated vehicle behavior plan (which may include one plan or a plurality of plans) to the driver. Then, when the user operation indicating the intention to approve of and adopt the suggested vehicle behavior plan is performed by the driver and acquired through the driver behavior check unit 64, the driving task is implemented by the driving control unit 66 based on the vehicle behavior plan.

To allow the driver to easily make a decision, the suggestion of the vehicle behavior plan may indicate, not details of the vehicle behavior plan, but a summary of the vehicle behavior plan. Examples of a suggestion of this type include presenting a question for causing the driver to choose whether the driver travels through a road A or a road B, presenting a question for causing the driver to choose whether or not the driver stops at a service area ("SA" in the drawing) while driving on a highway, and the like.

Depending on the situation, the vehicle behavior plan preparation unit 69 can skip processing of making a suggestion to the driver and processing of receiving the intention input thereto from the driver. In this case, the vehicle behavior plan produced by the vehicle behavior plan preparation unit 69 is immediately determined to be adopted as a basis for the implementation of the driving task by the driving control unit 66. For example, when a full automatic mode in which the vehicle 1 is fully responsible for determining the vehicle behavior is set in the autonomous driving function set by the driver, the processing described above is skipped. Alternatively, for example, when the scheduled driving line or the speed of the vehicle 1 is slightly corrected due to a change in the peripheral environment or the like also, the processing described above is skipped.

The vehicle behavior plan preparation unit 69 can generate the second task priority plan as a vehicle behavior plan until the driving mode is switched by which the autonomous driving level is switched from the level 3 to a level equal to or lower than the level 2. The second task priority plan is the vehicle behavior plan in which the convenient finish time described above comes before the driving mode switching.

In generating the second task priority plan, the vehicle behavior plan preparation unit 69 sets the route to the destination, and then sets a scheduled driving mode switching spot at which the driving mode switching is expected to be performed based on the information on the external environment of the vehicle 1 recognized by the environment recognition unit 63. The scheduled driving mode switching spot may be a spot on a road or a zone on a road having a length.

The vehicle behavior plan preparation unit 69 selects, as the scheduled driving mode switching spot, a spot which allows the level 3 state to be maintained throughout the longest possible section and which places a relatively light driving load on the driver at the time of driving mode switching. For example, in driving mode switched triggered by the entrance from the possible zone in which the level 3 autonomous driving is possible into the impossible zone, when there is a large road shape change at a spot immediately before the entrance into the impossible zone, a spot located before the spot with the large road shape change and having a relatively small road shape change is chosen as the scheduled driving mode switching spot. When the road on which the vehicle 1 drives has a linearly extending road shape, a road shape change is assumed to be small. When the road has a curved road shape, a road shape in which the number of lanes increases or decreases, or a road shape with a junction, a branching point, or a point of intersection, a road shape change is assumed to be large.

For example, when the vehicle 1 is on the way from a highway to a general road and the level 3 autonomous driving is possible up to the interchange exit of the highway, the scheduled driving mode switching spot is set more preferably to a linear section of a main road of the highway before the vehicle 1 enters a ramp connecting the main road of the highway to the interchange exit than to the ramp.

When the scheduled driving mode switching spot is set, the vehicle behavior plan preparation unit 69 calculates a provisional scheduled driving mode switching time corresponding to a time at which the vehicle 1 is expected to arrive at the scheduled driving mode switching spot under a hypothetical condition that the vehicle 1 is driven at a standard speed, an optimum speed depending on a traffic amount, or a speed (which is assumed to be a provisional speed) at which the vehicle 1 is currently driven.

Figure 3:
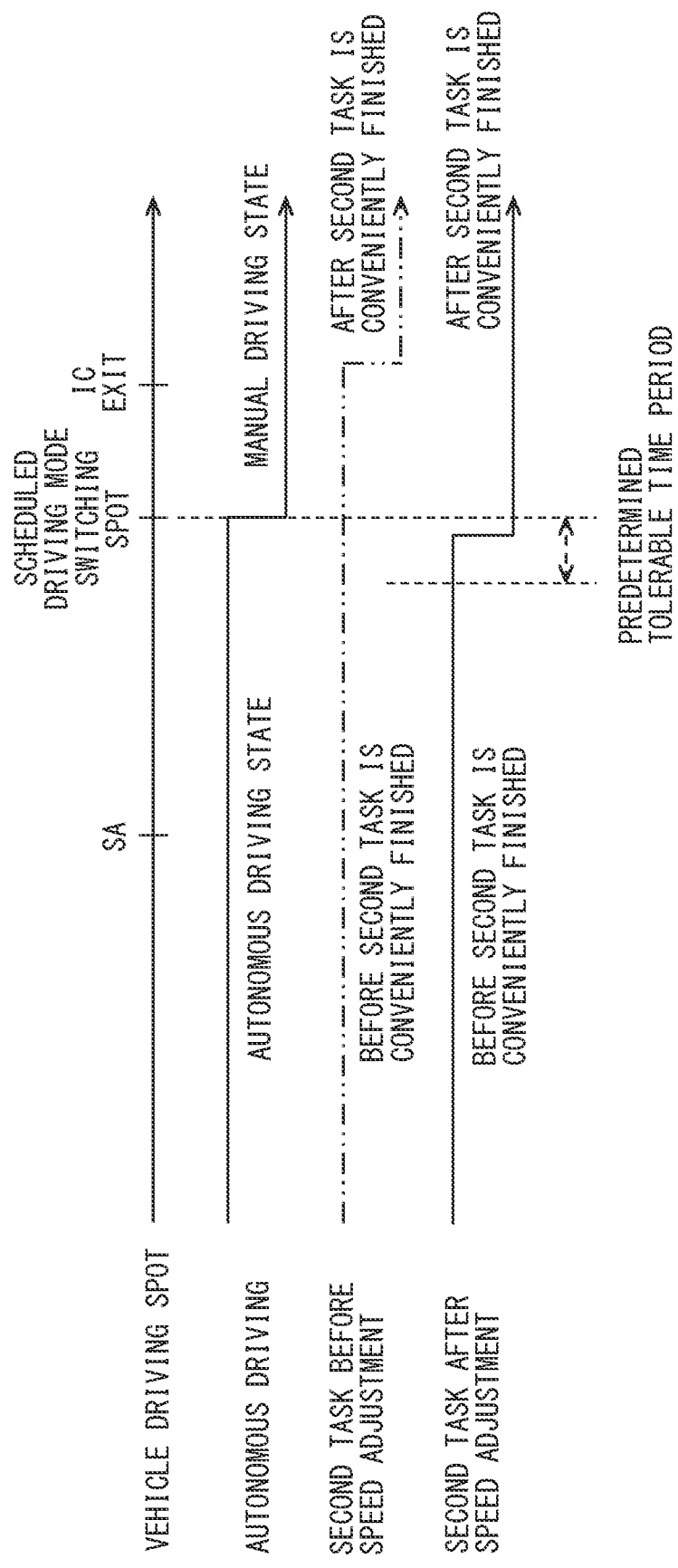
FIG. 3 is a timing chart illustrating an example of a second task priority plan in the first embodiment.

The vehicle behavior plan preparation unit 69 further refers to the convenient finish time held by the second task information grasp unit 68 and compares the convenient finish time to the calculated provisional scheduled driving mode switching time. As illustrated in FIG. 3, when the provisional scheduled driving mode switching time is before the convenient finish time, the vehicle behavior plan preparation unit 69 adjusts the speed of the vehicle 1 in the second task priority plan relative to the provisional speed such that the scheduled mode switching time in the second task priority plan is at the same time as or after the convenient finish time. More specifically, by setting the speed of the vehicle 1 in the second task priority plan lower than the provisional speed, it is possible to allow the vehicle 1 to arrive at the scheduled driving mode switching spot later. Thus, the scheduled mode switching time in the second task priority plan can be set at the same time as or after the convenient finish time. This can reduce a possibility that the driving mode switching is performed in a state where the second task is inconveniently finished.

Figure 4:
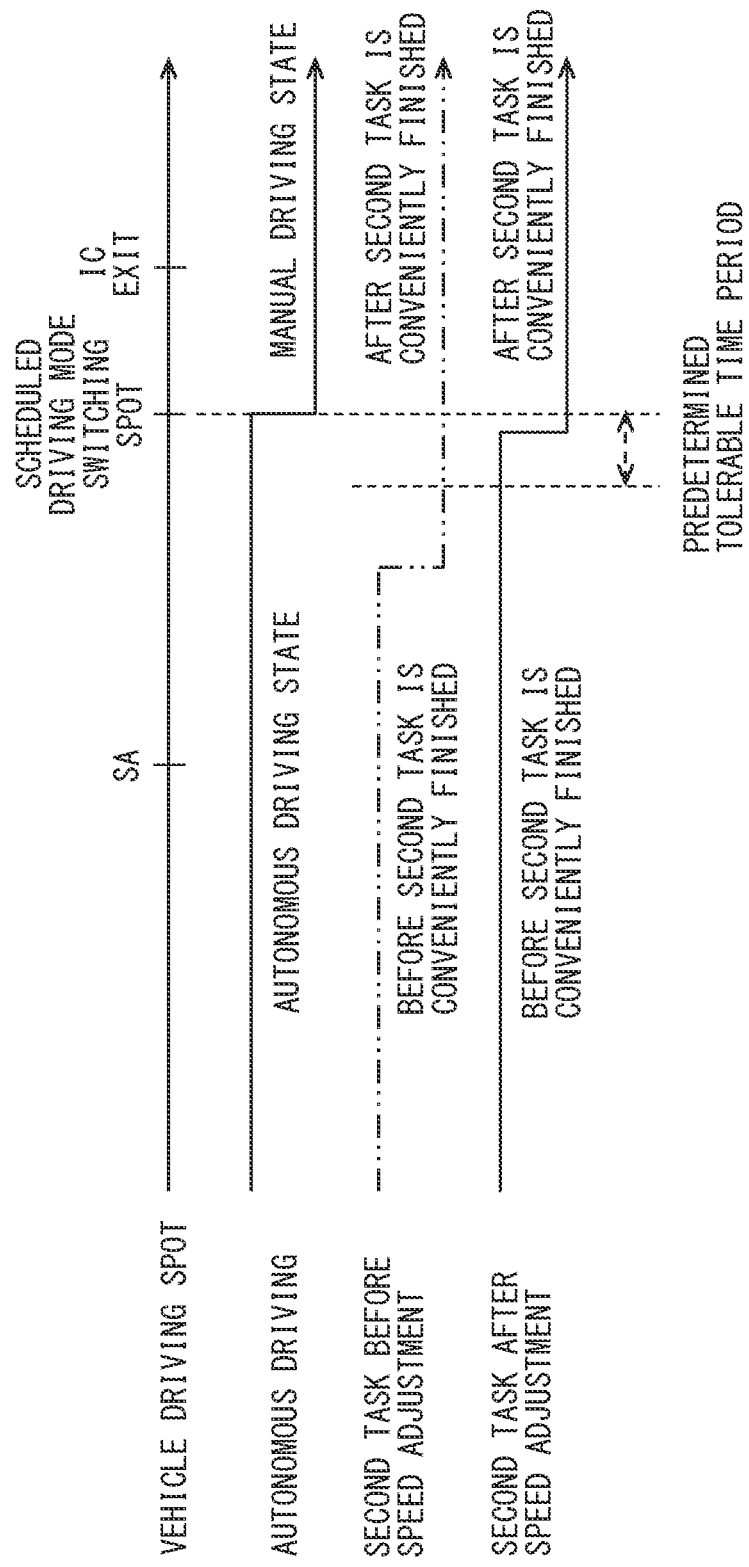
FIG. 4 is a timing chart illustrating another example of the second task priority plan in the first embodiment.

Meanwhile, as illustrated in FIG. 4, when the convenient finish time is excessively earlier than the scheduled driving mode switching time, a large gap is formed between conveniently finishing timing and driving mode switching timing. As a result, e.g., the driver may be at a loss for how to spend spare time or start the next second task, and therefore such a gap is not preferable. Accordingly, the vehicle behavior plan preparation unit 69 preferably makes a speed adjustment by setting the speed of the vehicle 1 in the second task priority plan higher than the provisional speed such that a gap time period between the convenient finish time and the scheduled mode switching time is equal to or shorter than a predetermined tolerable time period (e.g., 5 minutes or shorter).

Alternatively, as described above, when the second task has a property such that the convenient finish time is hard to predict or unpredictable, such as viewing of a website, the vehicle behavior plan preparation unit 69 may also produce, as the second task priority plan, a plan to cause, instead of making a speed adjustment, the driver to stop the vehicle 1 in a vehicle stoppable area (e.g., service area) before the scheduled driving mode switching spot until the second task is ended. This plan is formally adopted after making of a suggestion to the driver and reception of the intention from the driver.

Figure 5:
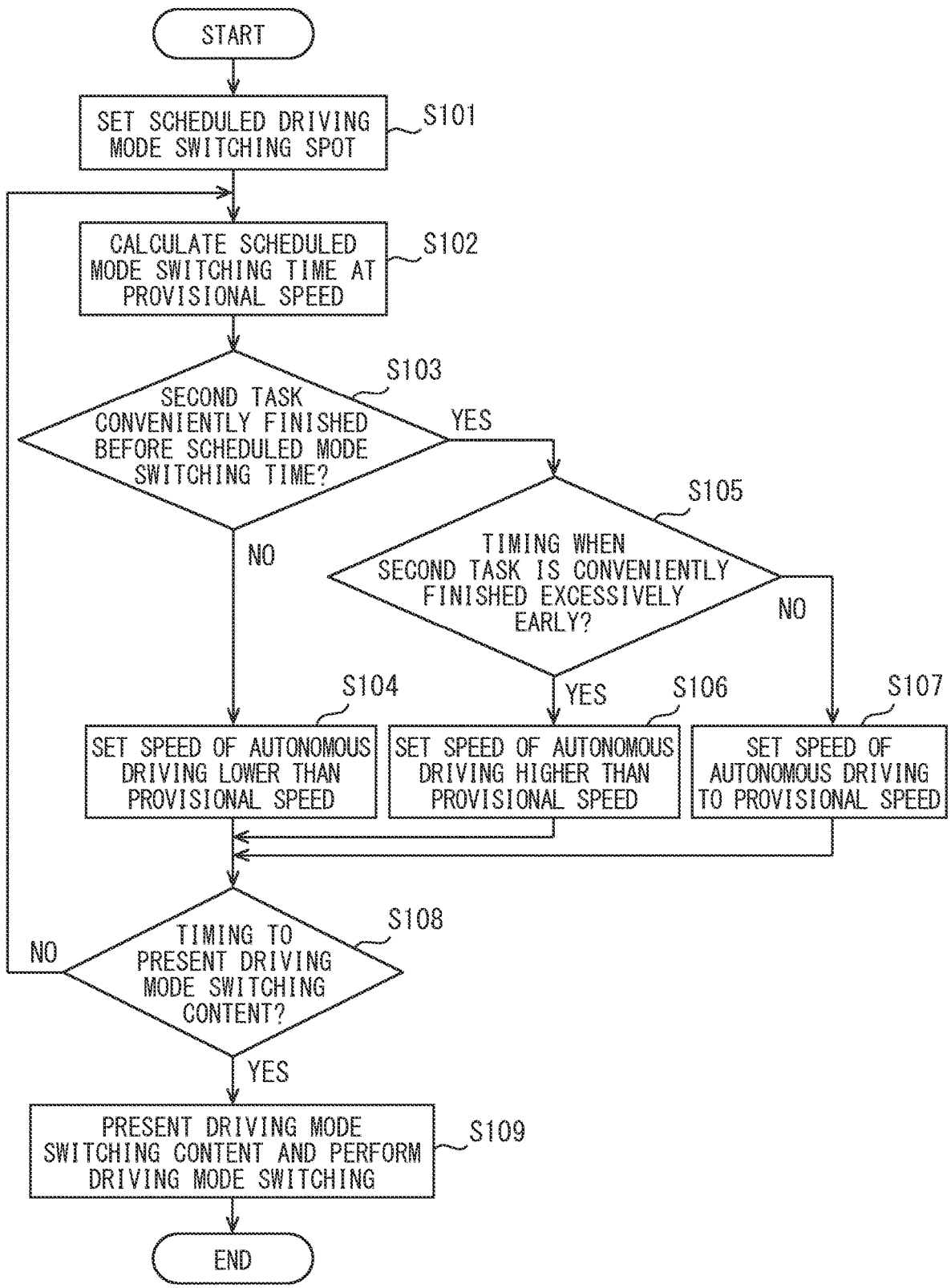
FIG. 5 is a flow chart illustrating processing by the autonomous driving ECU in the first embodiment.

Next, processing of generating the second task priority plan based on the program stored in the storage unit 43 and executed by the processing unit 41, processing of implementing the driving task based on the second task priority plan, and processing for switching the driving mode will be described based on individual steps of a flow chart in FIG. 5. It is assumed that, in the following description, the convenient finish time is predicted.

In S101, the vehicle behavior plan preparation unit 69 sets the scheduled driving mode switching spot. After the processing in S101, the vehicle behavior plan preparation unit 69 moves to S102.

In S102, the vehicle behavior plan preparation unit 69 sets the scheduled driving mode switching spot when the vehicle 1 is driven at the provisional speed. It is assumed herein that the current speed of the vehicle 1 being driven is the provisional speed. After the processing in S102, the vehicle behavior plan preparation unit 69 moves to S103.

In S103, the vehicle behavior plan preparation unit 69 determines whether or not the second task is conveniently finished before the scheduled driving mode switching time calculated in S102 is reached. Specifically, the convenient finish time held by the second task information grasp unit 68 and the scheduled mode switching time are compared to each other as described above. When an affirmative determination is made in S103, the vehicle behavior plan preparation unit 69 moves to S105. When a negative determination is made in S103, the vehicle behavior plan preparation unit 69 moves to S104.

In S104, the vehicle behavior plan preparation unit 69 sets a speed of autonomous driving of the vehicle 1 in the second task priority plan lower than the provisional speed. At this time, it may also be possible that, as the gap time period between the convenient finish time and the scheduled mode switching time is longer, a speed reduction is set larger. Alternatively, the speed reduction may also be a basic reduction (e.g., 5 km/h) set in advance. Even when the basic reduction is reduced, by repeating loop processing of steps described later, it is possible to gradually correct the gap time period.

It is assumed herein that, in S104 performed the first time, processing of making a suggestion related to the speed adjustment to the driver and receiving the intension from the driver is performed. In S104 performed the second time by the loop processing and thereafter, it is assumed that the processing of making the suggestion to the driver and receiving the intention from the user is skipped, and the speed adjustment is immediately adopted. In other words, the driving control unit 66 accelerates the vehicle 1 such that the driving task is implemented at the speed adjusted in S104. After the processing in S104, the vehicle behavior plan preparation unit 69 moves to S108.

In S105, the vehicle behavior plan preparation unit 69 determines whether or not timing when the second task is conveniently finished is excessively early. Specifically, it is determined whether or not the gap time period between the convenient finish time and the scheduled mode switching time is larger than the tolerable time period. When an affirmative determination is made in S105, the vehicle behavior plan preparation unit 69 moves to S106. When a negative determination is made in S105, the vehicle behavior plan preparation unit 69 moves to S107.

In S106, the vehicle behavior plan preparation unit 69 sets the speed of the autonomous driving of the vehicle 1 in the second task priority plan higher than the provisional speed. At this time, it may also be possible that, as the gap time period between the convenient finish time and the scheduled mode switching time is longer, a speed increase is set larger. It is assumed herein that the processing of making the suggestion to the driver and receiving the intention from the user is skipped, and the second task priority plan based on the adjusted speed is immediately adopted. In other words, the driving control unit 66 accelerates the vehicle 1 such that the driving task is implemented at the speed adjusted in S106. After the processing in S106, the vehicle behavior plan preparation unit 69 moves to S108.

In S107, the vehicle behavior plan preparation unit 69 sets the speed of the autonomous driving of the vehicle 1 in the second task priority plan to the provisional speed. It is assumed herein that the processing of making the suggestion to the driver and receiving the intention from the user is skipped, and the second task priority plan based on the adjusted speed is immediately adopted. In other words, the driving control unit 66 accelerates the vehicle 1 such that the driving task is implemented at the speed adjusted in S107.

After the processing in S107, the vehicle behavior plan preparation unit 69 moves to S108.

In S108, the information presentation instruction unit 67 cooperates with the autonomous driving state management unit 65, the vehicle behavior plan preparation unit 69, and the like to determine whether or not it is timing to present, to the driver, the driving mode switching content which recommends, suggests, or cautions about driving mode switching. For example, when the vehicle has passed through a spot at a predetermined distance to the scheduled driving mode switching spot, the information presentation instruction unit 67 determines that it is timing to present the driving mode switching content to the driver. When a negative determination is made in S108, the vehicle behavior plan preparation unit 69 returns to S102 after a lapse of a predetermined restart time period and thereby starts the loop processing. In other words, when there is spare time before the driving mode switching, the vehicle behavior plan preparation unit 69 takes in a change in a traffic amount resulting from a lapse of time, a change in progress of the second task, and the like to correct the second task priority plan. When an affirmative determination is made in S108, the vehicle behavior plan preparation unit 69 moves to S109.

In S109, the information presentation instruction unit 67 causes the driving mode switching content to be presented to the driver through the HCU 20, the information presentation device 30, and the like. Then, the user operation indicating the intention of the driver to take over the implementation of the driving task is input, and the driving mode switching is performed. The sequential processing ends with S109.

Note that, in the first embodiment, the autonomous driving ECU 40 corresponds to a "driving control device" that controls driving in the vehicle 1 involving driving mode switching, and corresponds also to a "vehicle behavior suggestion device" that suggests a vehicle behavior plan in the autonomous driving state in the vehicle 1 involving driving mode switching. The driving control unit 66 corresponds to a "driving task implementation unit" configured to implement the driving task based on the vehicle behavior plan. The vehicle behavior plan preparation unit 69 corresponds to a "vehicle behavior plan generation unit" configured to generate the second task priority plan, and corresponds also to a "vehicle behavior plan suggestion unit" configured to generate the second task priority plan by using information and suggests the second task priority plan to the driver.

Operation and Effect

The operation and effect of the first embodiment described heretofore will be described again below.

According to the first embodiment, the second task priority plan is the plan in which the convenient finish time at which the second task being implemented by the driver in the autonomous driving state is conveniently finished comes before the driving mode switching. When the driving task in the autonomous driving state is implemented by the driving control unit 66 based on such a plan, at the time of driving mode switching at which the driving mode is switched from the autonomous driving state to the manual driving state or to the driving assistance state, the second task has already been conveniently finished. Accordingly, the driver is enabled to smoothly direct attention from the second task to driving. This enables to inhibit the driver from feeling a sense of discomfort and thereby allow the driver to accept comfortable driving mode switching.

According also to the first embodiment, in the second task priority plan, the speed of the vehicle 1 is adjusted such that the scheduled mode switching time corresponding to the time at which the vehicle 1 is expected to arrive at the scheduled driving mode switching spot is at the same time as or after the convenient finish time. The adjustment of the speed of the vehicle 1 allows fine adjustment or fine correction to be easily performed, and accordingly it is possible to finely adjust the scheduled mode switching time in response to a change in a situation of the road on which the vehicle 1 is driving or in a situation of the second task. Therefore, a remarkable effect of reducing the possibility that the driving mode switching is performed in a state where the second task is inconveniently finished is achieved.

According also to the first embodiment, the speed of the vehicle 1 is adjusted such that, while the vehicle 1 is driving on the linear road in the second task priority plan, the second task currently being performed is conveniently finished and the vehicle 1 arrives at the scheduled driving mode switching spot. In other words, in a state where the second task is conveniently finished, the driving mode switching is performed on the linear road. Accordingly, it is possible to perform the driving mode switching in a state where the driver is attentive and concentrated and a driving load is relatively small, while maintaining a state where the vehicle 1 is driven before and after the driving mode switching. Therefore, highly safe driving mode switching is accomplished to allow the driver to accept the comfortable driving mode switching.

According also to the first embodiment, the second task priority plan is the plan in which the convenient finish time predicted based on the state of the driver photographed by the DSM 11 provided in the vehicle 1 comes before the driving mode switching. Since the convenient finish time is predicted by photographing the driver, even when the second task is any of various types remotely related to a vehicle configuration such as not cooperating with control of the vehicle configuration, it is possible to allow the driver to accept comfortable driving mode switching.

According also to the first embodiment, when the vehicle behavior plan preparation unit 69 generates the second task priority plan, confirmation of the intention of the driver is skipped, and the driving task is implemented by the driving control unit 66 based on the second task priority plan. By skipping the confirmation of the intention, it is possible to reduce troublesomeness felt by the driver in expressing the intention.

According also to the first embodiment, after the second task priority plan generated by the vehicle behavior plan preparation unit 69 is approved by the driver, the driving task is implemented by the driving control unit 66 based on the second task priority plan. Since the second task priority plan is adopted after the approval by the driver, it is possible to reduce a problem that the delayed arrival at the destination occurs due to a vehicle behavior change or the like when the driver does not emphasize the second task.

According also to the first embodiment, the second task priority plan is the plan in which the convenient finish time at which the second task being implemented by the driver in the autonomous driving state is conveniently finished comes before the driving mode switching. Such a plan is generated using information related to the second task and suggested to the driver. This allows the driver to selectively adopt the second task priority plan depending on whether the driver wishes to prioritize the second task or wishes to prioritize the driving task and thereby choose to implement the second task until the convenient finish time. By allowing the driver to make his or her own choice, it is possible to inhibit the driver from feeling a sense of discomfort at the time of driving mode switching and allow the driver to accept comfortable driving mode switching.

According also to the first embodiment, when the property of the second task is such that the convenient finish time is unpredictable, the second task priority plan to stop the vehicle 1 in the vehicle stoppable area before the scheduled driving mode switching spot until the second task is ended is suggested. Accordingly, even when the second task, of which the convenient finish time is unknown, is implemented, it is possible to smoothly end the second task before the driving mode switching. Therefore, it is possible to allow the driver to comfortably accept the driving mode switching.

Second Embodiment

Figure 6:
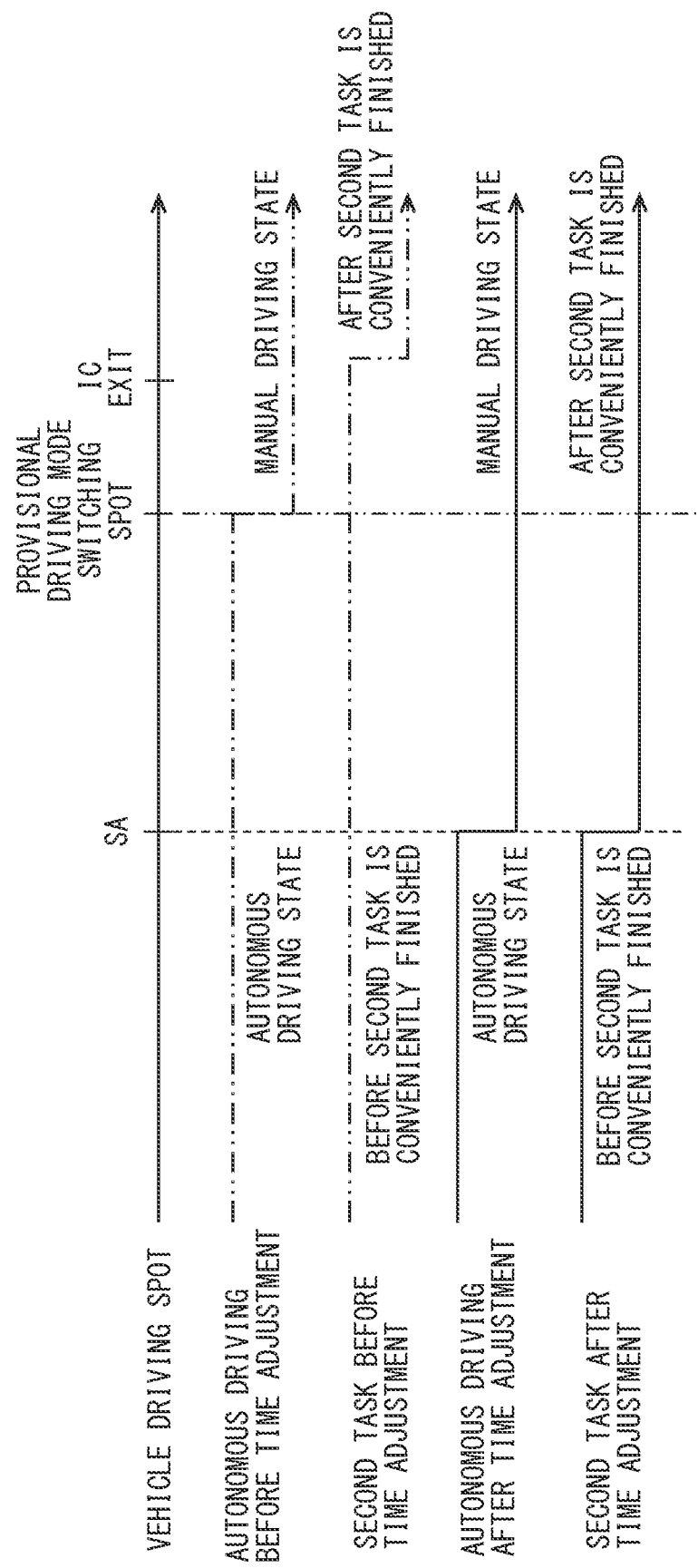
FIG. 6 is a timing chart illustrating an example of a second task priority plan in a second embodiment.
Figure 7:
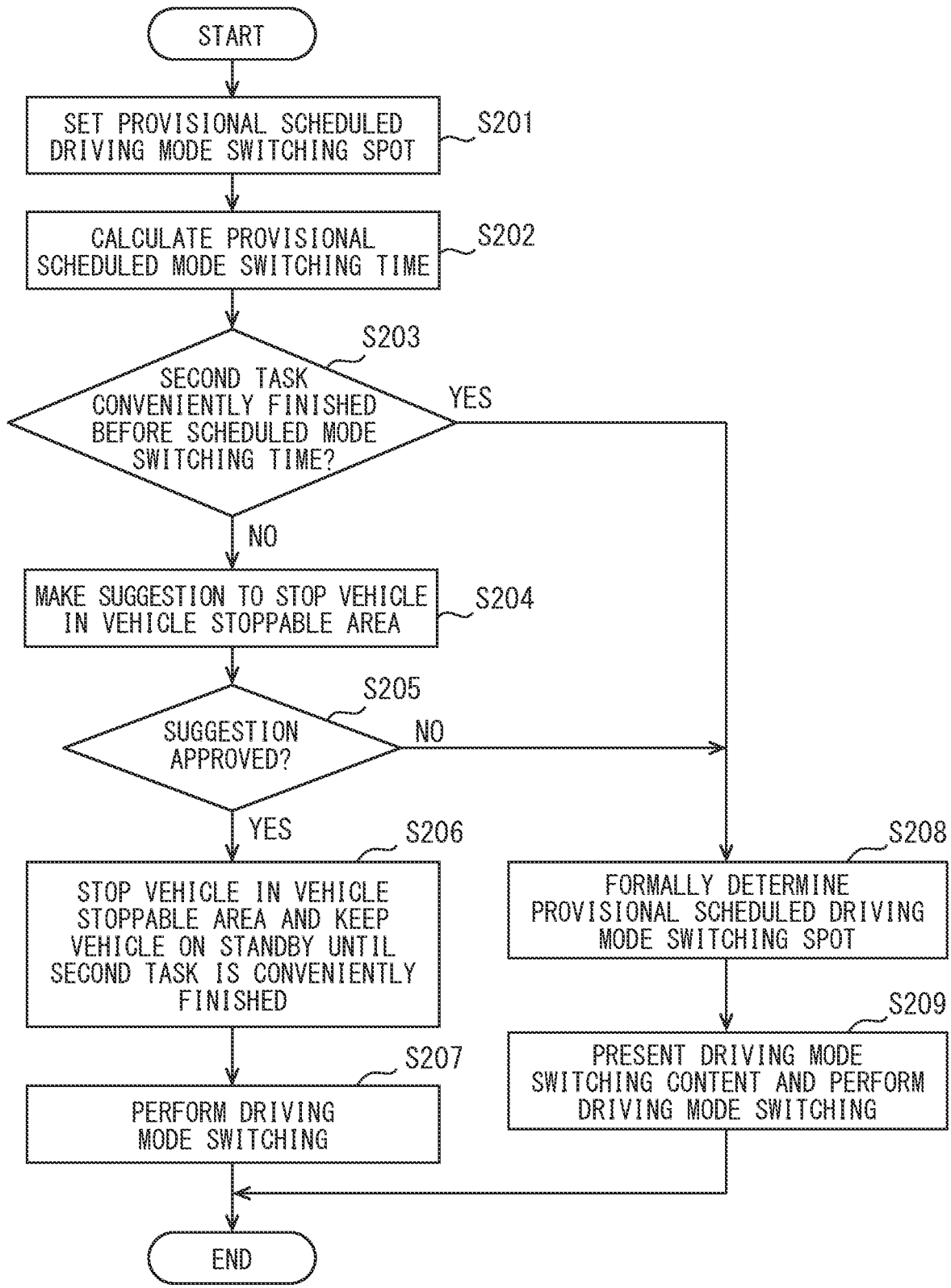
FIG. 7 is a flow chart illustrating processing by an autonomous driving ECU in the second embodiment.

As illustrated in FIGS. 6 and 7, the second embodiment is a modification of the first embodiment. A description will be given of the second embodiment with an emphasis on points different from those in the first embodiment.

In the same manner as in the first embodiment, the vehicle behavior plan preparation unit 69 in the second embodiment sets the provisional scheduled driving mode switching spot, calculates the provisional scheduled mode switching time, and compares the convenient finish time to the provisional scheduled mode switching time. When the provisional scheduled mode switching time is before the convenient finish time, the vehicle behavior plan preparation unit 69 determines, based on the information in the high-accuracy map DB or the like, whether or not there is a vehicle stoppable area before the provisional scheduled driving mode switching spot. When it is recognized that there is a vehicle stoppable area, the vehicle behavior plan preparation unit 69 produces, as the second task priority plan, a plan to make a time adjustment by stopping the vehicle 1 in the vehicle stoppable area. Note that a reference spot for the comparison and the determination described above need not necessarily be the provisional scheduled driving mode switching spot and may also be, e.g., a boundary spot between the possible zone in which the level 3 autonomous driving is possible and the impossible zone in which the autonomous driving is impossible.

For example, as illustrated in FIG. 6, when the vehicle 1 is on the way from a highway to a general road and the level 3 autonomous driving is possible up to the interchange exit of the highway, the plan is produced in which a time adjustment is made by stopping the vehicle 1 in a service area serving as the vehicle stoppable area which is present before the interchange exit.

In the second task priority plan in the present embodiment, the scheduled driving mode switching spot is set in the vehicle stoppable area, in place of the provisional scheduled driving mode switching spot. In other words, the vehicle 1 is stopped in the vehicle stoppable area until the convenient finish time is reached and, at a stage at which the convenient finish time is reached, the driving mode switching is performed.

The vehicle behavior plan preparation unit 69 suggests this second task priority plan to the driver through the information presentation instruction unit 67, the HCU 20 and the information presentation device 30, and the like. In response to such information presentation, the driver performs a user operation indicating an intention to approve of and adopt the suggested second task priority plan through the non-driving operation device 12b, and the user operation is acquired through the driver behavior check unit 64. Then, based on the second task priority plan, the driving control unit 66 implements the driving task.

When the user operation indicating the intention to approve of and adopt the suggested second task priority plan is not performed by the driver, the vehicle behavior plan preparation unit 69 prepares another vehicle behavior plan. The vehicle behavior plan preparation unit 69 may suggest another vehicle behavior plan again or skip making of a suggestion or inputting of the intention and prepare the other vehicle behavior plan.

Such a suggestion of the second task priority plan to the driver is technically possible at any time after, e.g., the entrance of the vehicle 1 into the possible zone in which the level 3 autonomous driving is possible and the start of a specified second task by the driver. Note that the vehicle behavior plan preparation unit 69 suggests the second task priority plan to the driver with timing while the vehicle 1 is travelling a section of the possible zone belonging to a second half thereof in terms of distance. By doing so, the second task priority plan can be produced in a state where accuracy of the convenient finish time and accuracy of the scheduled mode switching time are high, and therefore it is possible to further reduce the possibility that the driving mode switching is performed in a state where the second task is inconveniently finished. In the second embodiment, in a more preferred mode, the timing of a suggestion to the driver is set immediately before the vehicle stoppable area (e.g., several hundreds of meters before lane branching to the vehicle stoppable area).

Next, the processing of generating the second task priority plan based on the program stored in the storage unit 43 and executed by the processing unit 41, the processing of implementing the driving task based on the second task priority plan, and the processing for switching the driving mode will be described based on individual steps of a flow chart in FIG. 7.

S201 to S203 are the same as S101 to S103. When an affirmative determination is made in S203, the vehicle behavior plan preparation unit 69 moves to S208. When a negative determination is made in S203, the vehicle behavior plan preparation unit 69 moves to S204.

In S204, the vehicle behavior plan preparation unit 69 produces the second task priority plan to stop the vehicle 1 in the vehicle stoppable area (e.g., service area) and make a time adjustment and suggests the second task priority plan to the driver. After the processing in S204, the vehicle behavior plan preparation unit 69 moves to S205.

In S205, the vehicle behavior plan preparation unit 69 determines whether or not the suggestion made in S204 is approved of. When an affirmative determination is made in S205, the vehicle behavior plan preparation unit 69 moves to S206. When a negative determination is made in S205, the vehicle behavior plan preparation unit 69 moves to S208.

In S206, since the second task priority plan to stop the vehicle 1 in the vehicle stoppable area is approved of, the driving control unit 66 implements the driving task based on the second task priority plan. Specifically, the route in the vehicle behavior is changed to a route to the vehicle stoppable area, and the scheduled driving mode switching spot is also changed to the vehicle stoppable area. The driving control unit 66 stops the vehicle 1 in the vehicle stoppable area and keeps the vehicle 1 on standby until the convenient finish time at which the second task is conveniently finished. After the processing in S206, the vehicle behavior plan preparation unit 69 moves to S207.

In S207, as soon as the second task is conveniently finished, the driving mode switching is performed. From the vehicle stoppable area to the destination, the driver is responsible for implementing the driving task. The sequential processing ends with S207.

Meanwhile, in S208 in which the second task priority plan is not adopted, the vehicle behavior plan preparation unit 69 determines the provisional scheduled driving mode switching spot set in S201 to be a formal scheduled driving mode switching spot, and produces another vehicle behavior plan giving no consideration to the second task. This plan is immediately adopted through the skipping of the suggestion and the inputting of the intention. In other words, the driving control unit 66 drives the vehicle 1 at a standard speed up to the formally determined scheduled driving mode switching spot. After the processing in S208, the vehicle behavior plan preparation unit 69 moves to S209.

S209 in which processing is performed with timing when the driving mode switching content is to be presented is the same as S109. The sequential processing ends with S209.

According to the second embodiment described heretofore, when the scheduled mode switching time serving as a time at which the vehicle 1 is expected to arrive at the provisional scheduled driving mode switching spot is before the convenient finish time, the second task priority plan is the plan to stop the vehicle 1 in the vehicle stoppable area before the provisional scheduled driving mode switching spot and make a time adjustment. Since the plan stops the vehicle without causing the vehicle 1 to continue to drive, it is possible to increase certainty with which the driving mode switching is performed after the second task is conveniently finished.

According also to the second embodiment, the second task priority plan is the plan to stop the vehicle 1 in the vehicle stoppable area until the convenient finish time and change the setting of the scheduled driving mode switching spot to the vehicle stoppable area. Since the scheduled driving mode switching spot is changed to the vehicle stoppable area, it is possible to avoid a situation in which, when the vehicle 1 travels from the vehicle stoppable area to another scheduled driving mode switching spot in the autonomous driving state, the driver starts a new second task and the new second task is not conveniently finished before the driving mode switching.

According also to the second embodiment, the second task priority plan is suggested with timing while the vehicle 1 is driving in the section belonging to the second half of the autonomous driving possible zone in which the autonomous driving is possible. By suggesting the second task priority plan in the section belonging to the second half near to the driving mode switching, it is possible to increase accuracy of predicting the scheduled mode switching time and the convenient finish time in the second task priority plan which is generated with the suggestion timing. Therefore, it is possible to enhance the effect of reducing the possibility that the driving mode switching is performed in a state where the second task is inconveniently finished.

Third Embodiment

Figure 8:
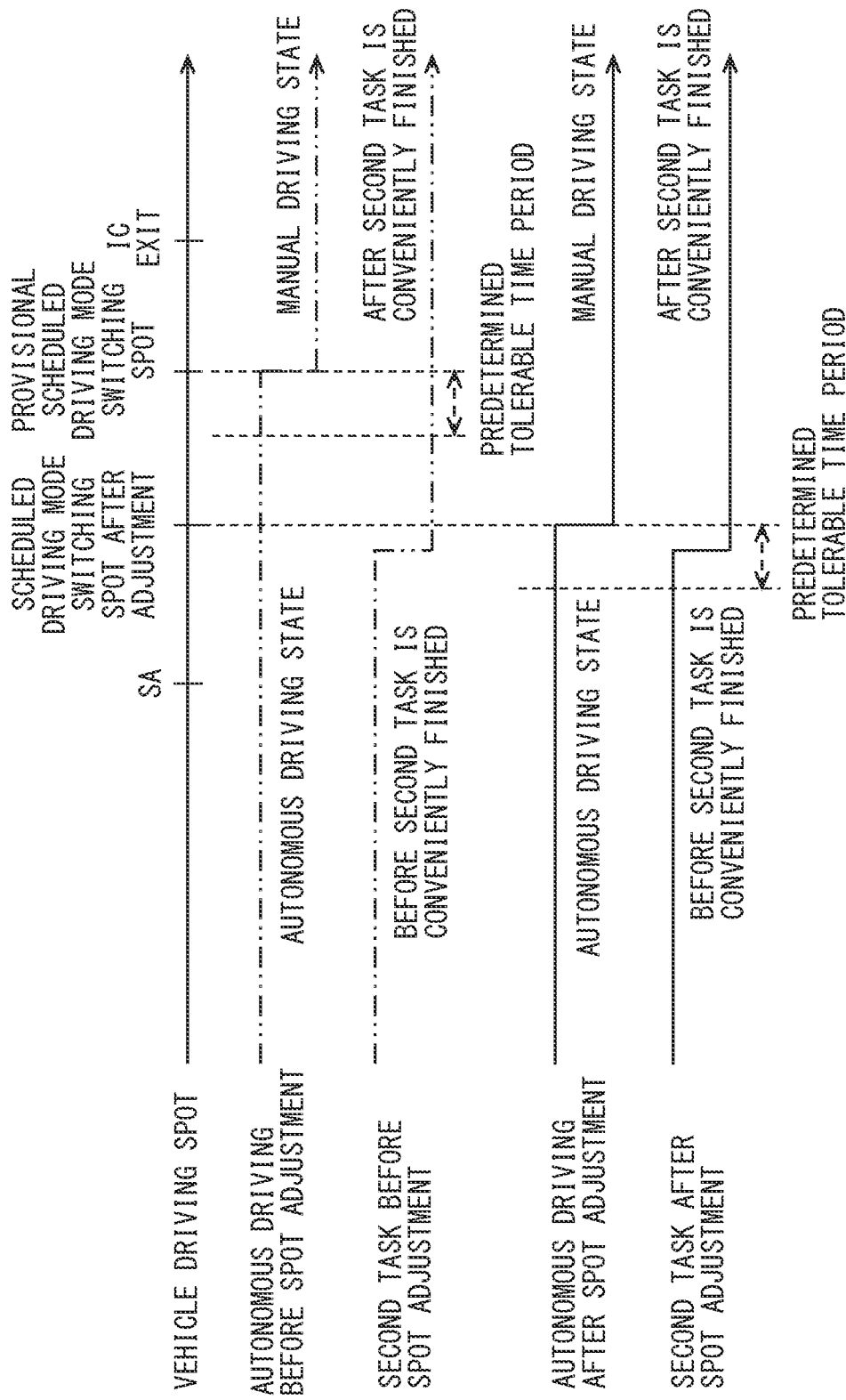
FIG. 8 is a timing chart illustrating an example of a second task priority plan in a third embodiment.
Figure 9:
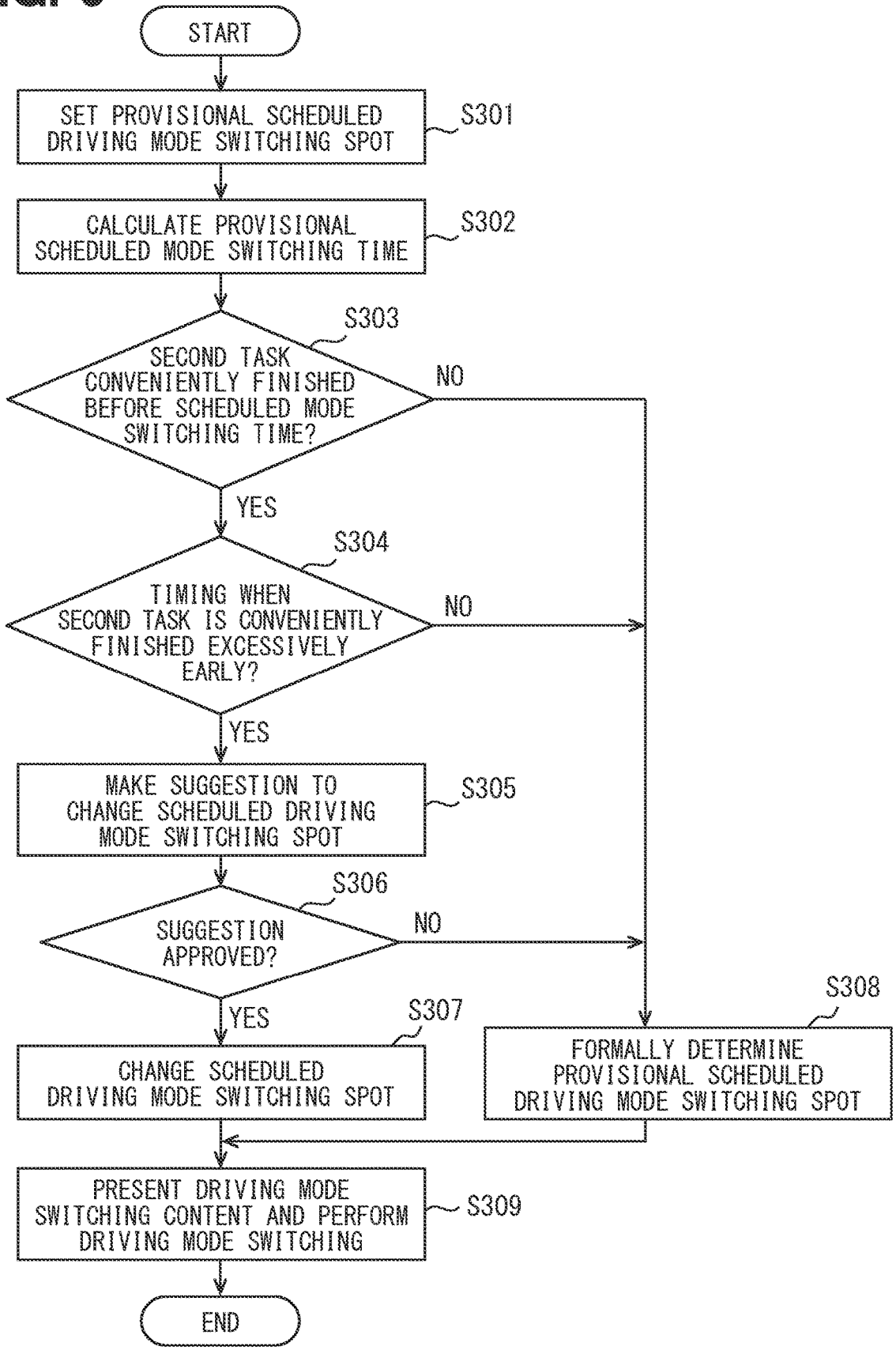
FIG. 9 is a flow chart illustrating processing by an autonomous driving ECU in the third embodiment.

As illustrated in FIGS. 8 and 9, the third embodiment is a modification of the first embodiment. A description will be given of the third embodiment with an emphasis on points different from those in the first embodiment.

In the same manner as in the first embodiment, the vehicle behavior plan preparation unit 69 in the third embodiment sets the provisional scheduled driving mode switching spot, calculates the provisional scheduled mode switching time, and compares the convenient finish time to the provisional scheduled mode switching time. When the convenient finish time is before the scheduled mode switching time at which the scheduled driving mode switching spot is expected to be reached by a time period equal to or longer than a tolerable time period, the vehicle behavior plan preparation unit 69 changes the setting of the scheduled driving mode switching spot in the second task priority plan to a spot at which the scheduled mode switching time comes after a lapse of a time period shorter than a predetermined tolerable time period from the convenient finish time. The predetermined tolerable time period may be set equal to or different from the tolerable time period in the first embodiment.

For example, a situation in which the vehicle 1 is on the way from a highway to a general road and the level 3 autonomous driving is possible up to the interchange exit of the highway will be described. Under this situation, it is assumed that a movie is viewed as the second task and a first chapter of the movie is expected to end 5 minutes before the scheduled mode switching time at which the interchange exit (the expected end time corresponds to the convenient finish time) is expected to be reached. This leads to a possibility that reproduction of a second chapter is started, and the driving mode switching is performed after the second chapter is halfway viewed for five minutes.

Accordingly, the vehicle behavior plan preparation unit 69 produces, as the second task priority plan, a plan to change the scheduled driving mode switching spot to a spot immediately after a spot scheduled to be traveled at the expected end time so as to allow the driving mode to be switched immediately after the expected end time mentioned above. In other words, the scheduled driving mode switching spot in the second task priority plan is before the scheduled driving mode switching spot in a vehicle behavior plan in which the second task is not prioritized, and the level 3 state is maintained throughout a longest possible section.

Then, in the same manner in the second embodiment, the vehicle behavior plan preparation unit 69 suggests the second task priority plan to the driver.

Next, the processing of generating the second task priority plan based on the program stored in the storage unit 43 and executed by the processing unit 41, the processing of implementing the driving task based on the second task priority plan, and the processing for switching the driving mode will be described based on individual steps of a flow chart in FIG. 9.

S301 to S303 are the same as S101 to S103. When an affirmative determination is made in S303, the vehicle behavior plan preparation unit 69 moves to S308. When a negative determination is made in S203, the vehicle behavior plan preparation unit 69 moves to S304.

In S304, the vehicle behavior plan preparation unit 69 determines whether or not timing when the second task is conveniently finished is excessively early. Specifically, it is determined whether or not the scheduled mode switching time at which the provisional driving mode switching spot is expected to be reached is before the convenient finish time by a time period equal to or longer than the tolerable time period. When an affirmative determination is made in S304, the vehicle behavior plan preparation unit 69 moves to S305. When a negative determination is made in S304, the vehicle behavior plan preparation unit 69 moves to S308.

In S305, the vehicle behavior plan preparation unit 69 produces the second task priority plan in which the scheduled driving mode switching spot is changed to a spot before the provisional scheduled driving mode switching spot, and the scheduled mode switching time comes after the lapse of the time period shorter than the tolerable time period from the convenient finish time, and suggests the second task priority plan to the driver. After the processing in S305, the vehicle behavior plan preparation unit 69 moves to S306.

In S306, the vehicle behavior plan preparation unit 69 determines whether or not the suggestion made in S305 is approved of. When an affirmative determination is made in S306, the vehicle behavior plan preparation unit 69 moves to S307. When a negative determination is made in S306, the vehicle behavior plan preparation unit 69 moves to S308.

In S307, the second task priority plan to change the scheduled driving mode switching spot is approved of, and therefore the driving control unit 66 executes the driving task based on the second task priority plan. Specifically, the scheduled driving mode switching spot is changed. After the processing in S307, the vehicle behavior plan preparation unit 69 moves to S309.

Meanwhile, in S308 in which the second task priority plan is not adopted, another vehicle behavior plan similar to that produced in S208 is produced, and the vehicle behavior plan is immediately adopted. After the processing in S308, the vehicle behavior plan preparation unit 69 moves to S309.

S309 in which processing is performed with timing when the driving mode switching content is to be presented is the same as S109. The sequential processing ends with S309.

According to the third embodiment described above, when the scheduled mode switching time corresponding to the time at which the vehicle 1 is expected to arrive at the provisional scheduled driving mode switching spot comes after the convenient finish time by the time period equal to or longer than the predetermined tolerable time period, the second task priority plan is the plan in which the setting of the scheduled driving mode switching spot is changed to the spot at which the scheduled mode switching time comes after the lapse of the time period shorter than the tolerable time period from the convenient finish time. By changing the setting of the scheduled driving mode switching spot, it is possible to minimize a vehicle behavior change before the driving mode switching. Therefore, it is possible to allow the driver to accept comfortable driving mode switching, while implementing a natural vehicle behavior in the autonomous driving state.

Other Embodiments

The description has been given heretofore of the plurality of embodiments, the present disclosure should not be construed to be limited to those embodiments, and is applicable to various embodiments and combinations thereof within a scope not departing from the gist of the present disclosure.

Specifically, in a first modification, the second task management unit 27 of the HCU 20 need not necessarily predict the convenient finish time. It may also be possible that the second task information grasp unit 68 of the autonomous driving ECU 40 performs processing for at least one of specification of the type of the second task and prediction of the convenient finish time based on the extraction information acquired from the DSM 11, the driver behavior information obtained from the autonomous driving ECU 40 by the driver behavior check unit 64, and the like.

In a second modification, of the vehicle behavior plan prepared by the vehicle behavior plan preparation unit 69, a part may be prepared by another device. For example, the HCU 20 or a car navigation device additionally mounted produces a schematic route to the destination of the vehicle 1. Meanwhile, the vehicle behavior plan preparation unit 69 may prepare a line in which the vehicle 1 is expected to drive and the speed of the vehicle 1 based on the route and thereby complete the vehicle behavior plan.

In a third modification, the vehicle behavior plan preparation unit 69 need not necessarily have the function of suggesting the vehicle behavior plan. The vehicle behavior plan generated by the vehicle behavior plan preparation unit 69 may also be implemented by the driving control unit 66 without involving confirmation of the intention of the driver.

In a fourth modification, when the second task has a property such that the convenient finish time is hard to predict or unpredictable, the vehicle behavior plan preparation unit 69 may also present information indicating after how many minutes the scheduled mode switching time is reached through the HCU 20, the information presentation device 30, and the like and encourage the driver to end the second task before the scheduled mode switching time.

In a fifth modification related to the first embodiment, the vehicle behavior plan preparation unit 69 may also achieve, as a speed adjustment in the second task priority plan, either one of an increase and a reduction in a provisional speed.

In a sixth modification related to the second embodiment, the vehicle behavior plan preparation unit 69 may also leave as-is the initial scheduled driving mode switching spot on, e.g., a main road of a highway or the like in the second task priority plan without changing the scheduled driving mode switching spot to the vehicle stoppable area. In this case, the vehicle behavior plan preparation unit 69 may also change the second task priority plan to a plan to keep the vehicle 1 on standby in the vehicle stoppable area until the convenient finish time and then drive the vehicle 1 to the scheduled driving mode switching spot in the autonomous driving state after it is recognized that the convenient finish time was already reached or the second task was actually conveniently finished.

In this case, the vehicle behavior plan preparation unit 69 may also calculate a time of departure from the vehicle stoppable area which allows the vehicle 1 to arrive at the scheduled driving mode switching spot at the convenient finish time or at a time immediately thereafter. Then, the vehicle behavior plan preparation unit 69 may also change the second task priority plan to a plan to temporarily stop the vehicle 1 in the vehicle stoppable area, start the vehicle 1 moving again at the departure time, and drive the vehicle 1 in the autonomous driving state toward the scheduled driving mode switching spot.

In a seventh modification related to the second embodiment, the vehicle stoppable area is not limited to a service area. For example, when the vehicle 1 drives in the autonomous driving state on a general road, as the vehicle stoppable area, a park, a parking space of a convenient store, a roadside parking lane, a gas station, or the like can be adopted.

In an eighth modification, the vehicle behavior plan preparation unit 69 may also suggest, to the driver, the plurality of second task priority plans among the plan to make the speed adjustment described in the first embodiment, the plan to make the time adjustment in the vehicle stoppable area described in the second embodiment, and the plan to change the scheduled driving mode switching spot described in the third embodiment. The driver is enabled to choose the optimum plan from among the plurality of second task priority plans.

In a ninth modification, each of the functions provided by the HCU 20 and the autonomous driving ECU 40 can also be provided by software and hardware which implements the software, only the software, only the hardware, or a complex combination thereof. In addition, when such functions are provided by an electronic circuit serving as hardware, each of the functions can also be provided by a digital circuit including a large number of logic circuits or by an analog circuit.

In a tenth modification, a form of the storage medium storing thereon a program that can implement the information presentation control (information presentation control method) described above and the like may also be changed appropriately. For example, the storage medium is not limited to a configuration in which the storage medium is provided on a circuit board, and may also have a configuration in which the storage medium is provided in the form of a memory card or the like, inserted into the slot portion, and electrically connected to a control circuit of the HCU 20 or the autonomous driving ECU 40. Alternatively, the storage medium may also be an optical disk, a hard disk, or the like from which the program is to be copied to the HCU 20 or the autonomous driving ECU 40.

In an eleventh modification, it may also be possible that the HCU 20 and the autonomous driving ECU 40 are integrated into one electronic control device, and the electronic control device corresponds to the "driving control device". Alternatively, it may also be possible that the HCU 20 and the autonomous driving ECU 40 are integrated into one electronic control device, and the electronic control device corresponds to the "vehicle behavior suggestion device".

In a twelfth modification, it may also be possible that an electronic control device including the second task information grasp unit and the vehicle behavior plan suggestion unit having a function of generating the vehicle behavior plan and a function of suggesting the vehicle behavior plan is configured as another device other than the driving control device including the driving task implementation unit. In this case, the electronic control device corresponds to the "vehicle behavior suggestion device" that suggests the vehicle behavior plan in the autonomous driving state, but does not correspond to the "driving control device" that controls driving of the vehicle 1 involving the driving mode switching. The electronic control device may also be integrated with the HCU 20. In this case, the second task information grasp unit may also be integrated with the second task management unit 27.

In a thirteenth modification, the driving control device need not necessarily be mounted in the vehicle 1. When the driving control device is not mounted in the vehicle 1 and fixedly disposed outside the vehicle 1 or when the driving control device is mounted in another vehicle, the driving control may also be remotely performed by communication via the Internet, road-to-vehicle communication, inter-vehicle communication, or the like. The same applies also to the vehicle behavior suggestion device.

In a fourteenth modification, the vehicle 1 is also capable of performing autonomous driving of level 4 among autonomous driving levels defined by U.S. Society of Automotive Engineers. In this case also, driving mode switching may occur during travel of the vehicle 1 from the possible zone in which autonomous driving is possible to the impossible zone in which the autonomous driving is impossible. Accordingly, the second task priority plan based on the first to third embodiments is valid. The vehicle 1 may also have specifications such that the vehicle 1 temporarily stops at the time of driving mode switching in the level 4 autonomous driving.

In a fifteen modification, the vehicle 1 is not limited to a typical passenger vehicle for personal use, and may also be a vehicle to be rented, a vehicle for a driver-driven taxi, a ride sharing vehicle, a cargo vehicle, a bus, or the like.

In a sixteenth modification, it may also be possible that the driving operation device 12a is connected directly to the driving actuator 50 to allow the driver to directly operate the driving actuator 50 without interposition of the driving control unit 66 in the manual driving state or the driving assistance state.

In a seventeenth modification, the vehicle 1 may also be optimized according to a road traffic law of each of countries and regions. In addition, the vehicle behavior plan and the driving control produced and performed by the driving control device and the vehicle behavior plan suggested by the vehicle behavior suggestion device may also be optimized according to a road traffic law of each of countries and regions.

The control unit and the method therefor each described in the present disclosure may also be implemented by a dedicated computer forming a processor programmed to perform one or a plurality of functions embodied by a computer program. Alternatively, the devices and methods therefor each described in the present disclosure may also be implemented by dedicated hardware logic circuits. Still alternatively, the devices and methods therefor may also be implemented by one or more dedicated computers each including a combination of a processor that executes the computer program and one or more hardware logic circuits. the computer program may also be stored as an instruction to be executed by the computer in a computer readable non-transient tangible recording medium.

What is claimed is:

1. A driving control device configured to control driving of a vehicle involving driving mode switching between an autonomous driving state, in which the vehicle is responsible for implementing driving tasks including vehicle steering, vehicle driving, vehicle braking, and periphery monitoring, and a manual driving state or a driving assistance state, in which a driver of the vehicle is responsible for implementing at least one of the driving tasks, the driving control device comprising:
   at least one processor; and
   at least one memory storing computer program code, wherein the at least one memory and the computer program code are configured, with the at least one processor, to cause the driving control device to:
   implement any of the driving tasks based on a vehicle behavior plan, which indicates a vehicle behavior scheduled in the autonomous driving state;
   generate a second task priority plan, which is the vehicle behavior plan until the driving mode is switched from the autonomous driving state to the manual driving state, such that a convenient finish time, at which a second task being implemented by the driver in the autonomous driving state is conveniently finished, comes before the driving mode switching;
   provisionally set a scheduled driving mode switching spot, at which the driving mode switching is expected to be performed, based on an external environment of the vehicle;
   generate, as the second task priority plan, a plan to stop the vehicle in a vehicle stoppable area before the scheduled driving mode switching spot to make a time adjustment, when a scheduled mode switching time, at which the vehicle is expected to arrive at the scheduled driving mode switching spot, is before the convenient finish time; and in the second task priority plan, stop the vehicle in the vehicle stoppable area until the convenient finish time and change the scheduled driving mode switching spot to the vehicle stoppable area.

2. The driving control device according to claim 1, wherein
   the at least one memory and the computer program code are further configured, with the at least one processor, to cause the driving control device to:
   generate the second task priority plan, such that the convenient finish time predicted based on a state of the driver as photographed in the vehicle comes before the driving mode switching.

3. The driving control device according to claim 1, wherein
   the at least one memory and the computer program code are further configured, with the at least one processor, to cause the driving control device to:
   skip confirmation of an intention of the driver and implement any of the driving tasks based on the second task priority plan, in response to generation of the second task priority plan.

4. The driving control device according to claim 1, wherein
   the at least one memory and the computer program code are further configured, with the at least one processor, to cause the driving control device to:
   implement any of the driving tasks based on the second task priority plan after the second task priority plan as generated is approved by the driver.

5. A driving control device configured to control driving of a vehicle involving driving mode switching between an autonomous driving state, in which the vehicle is responsible for implementing driving tasks including vehicle steering, vehicle driving, vehicle braking, and periphery monitoring, and a manual driving state or a driving assistance state, in which a driver of the vehicle is responsible for implementing at least one of the driving tasks, the driving control device comprising:
   at least one processor; and
   at least one memory storing computer program code, wherein the at least one memory and the computer program code are configured, with the at least one processor, to cause the driving control device to:
   implement any of the driving tasks based on a vehicle behavior plan, which indicates a vehicle behavior scheduled in the autonomous driving state;
   generate a second task priority plan, which is the vehicle behavior plan until the driving mode is switched from the autonomous driving state to the manual driving state, such that a convenient finish time, at which a second task being implemented by the driver in the autonomous driving state is conveniently finished, comes before the driving mode switching;
   provisionally set a scheduled driving mode switching spot, at which the driving mode switching is expected to be performed, based on an external environment of the vehicle; and
   change the second task priority plan to a plan to change the scheduled driving mode switching spot to a spot, at which a scheduled mode switching time, at which the vehicle is expected to arrive at the scheduled driving mode switching spot, comes after a lapse of a time period shorter than a predetermined tolerable time period from the convenient finish time, when the convenient finish time is before the scheduled mode switching time by a time period equal to or longer than the tolerable time period.

6. A driving control device configured to control driving of a vehicle involving driving mode switching between an autonomous driving state, in which the vehicle is responsible for implementing driving tasks including vehicle steering, vehicle driving, vehicle braking, and periphery monitoring, and a manual driving state or a driving assistance state, in which a driver of the vehicle is responsible for implementing at least one of the driving tasks, the driving control device comprising:

at least one processor; and at least one memory storing computer program code, wherein the at least one memory and the computer program code are configured, with the at least one processor, to cause the driving control device to:

implement any of the driving tasks based on a vehicle behavior plan, which indicates a vehicle behavior scheduled in the autonomous driving state;

generate a second task priority plan, which is the vehicle behavior plan until the driving mode is switched from the autonomous driving state to the manual driving state, such that a convenient finish time, at which a second task being implemented by the driver in the autonomous driving state is conveniently finished, comes before the driving mode switching; and generate the second task priority plan, such that the convenient finish time, which is predicted based on a state of the driver as photographed in the vehicle, comes before the driving mode switching.

7. The driving control device according to claim 6, wherein the at least one memory and the computer program code are further configured, with the at least one processor, to cause the driving control device to:

generate, as the second task priority plan, a plan to set a scheduled driving mode switching spot, at which the driving mode switching is expected to be performed, based on an external environment of the vehicle and to adjust a speed of the vehicle, such that a scheduled mode switching time, at which the vehicle is expected to arrive at the scheduled driving mode switching spot, is simultaneous with or after the convenient finish time.

8. The driving control device according to claim 7, wherein the at least one memory and the computer program code are further configured, with the at least one processor, to cause the driving control device to:

adjust the speed of the vehicle in the second task priority plan, such that the second task currently being implemented is conveniently finished and such that the vehicle arrives at the scheduled driving mode switching spot while the vehicle drives on a linear road.

9. The driving control device according to claim 6, wherein the at least one memory and the computer program code are further configured, with the at least one processor, to cause the driving control device to:

provisionally set a scheduled driving mode switching spot, at which the driving mode switching is expected to be performed, based on an external environment of the vehicle; and generate, as the second task priority plan, a plan to stop the vehicle in a vehicle stoppable area before the provisional scheduled driving mode switching spot to make a time adjustment, when a scheduled mode switching time, at which the vehicle is expected to arrive at the scheduled driving mode switching spot, is before the convenient finish time.

10. A vehicle behavior suggestion device configured to suggest a vehicle behavior plan in an autonomous driving state of a vehicle involving driving mode switching between the autonomous driving state, in which the vehicle is responsible for implementing driving tasks including vehicle steering, vehicle driving, vehicle braking, and periphery monitoring, and a manual driving state or a driving assistance state, in which a driver of the vehicle is responsible for implementing at least one of the driving tasks, the vehicle behavior suggestion device comprising:

at least one processor; and at least one memory storing computer program code, wherein the at least one memory and the computer program code are configured, with the at least one processor, to cause the driving control device to:

grasp information related to a second task of the driver in the autonomous driving state;

generate, by using the information, a second task priority plan, which is the vehicle behavior plan until the driving mode is switched from the autonomous driving state to the manual driving state, such that a convenient finish time, at which the second task being implemented in the autonomous driving state is conveniently finished, comes before the driving mode switching, and suggest the second task priority plan to the driver;

provisionally set a scheduled driving mode switching spot, at which the driving mode switching is expected to be performed, based on an external environment of the vehicle, when the convenient finish time is unpredictable due to a property of the second task; and suggest the second task priority plan to prompt the driver to stop the vehicle in a vehicle stoppable area, which is before the scheduled driving mode switching spot, until the second task is ended.

11. The vehicle behavior suggestion device according to claim 10, wherein the at least one memory and the computer program code are further configured, with the at least one processor, to cause the driving control device to:

set timing, in response to suggestion of the second task priority plan, to timing, when the vehicle drives in a section belonging to a second half of an autonomous driving possible zone in which autonomous driving is possible.

* * * * *